US006097858A

United States Patent [19]
Laor

[11] Patent Number: 6,097,858
[45] Date of Patent: Aug. 1, 2000

[54] SENSING CONFIGURATION FOR FIBER OPTIC SWITCH CONTROL SYSTEM

[75] Inventor: Herzel Laor, Boulder, Colo.

[73] Assignee: Astarte Fiber Networks, Inc., Boulder, Calif.

[21] Appl. No.: 09/092,393

[22] Filed: Jun. 5, 1998

[51] Int. Cl.⁷ .................................................. G02B 6/26
[52] U.S. Cl. ................................. 385/16; 385/17; 385/19; 385/20; 385/24; 385/89; 385/90
[58] Field of Search ................................. 385/15–20, 24, 385/48, 88–91, 12, 13; 359/153–156; 250/227.14, 227.19, 227.24

[56] References Cited

U.S. PATENT DOCUMENTS

| | | | |
|---|---|---|---|
| 2,982,859 | 5/1961 | Steinbrecher | 250/205 |
| 3,492,484 | 1/1970 | Iti | 250/199 |
| 3,649,105 | 3/1972 | Treuthart | 350/285 |
| 3,990,780 | 11/1976 | Dakss | 350/96 |
| 4,003,655 | 1/1977 | Wasilko | 356/4 |
| 4,179,183 | 12/1979 | Tateoka et al. | 350/6.1 |
| 4,208,094 | 6/1980 | Tomlinson, III et al. | 350/96.2 |
| 4,234,145 | 11/1980 | Leiboff | 244/3.16 |
| 4,249,814 | 2/1981 | Hull et al. | 354/154 |
| 4,303,302 | 12/1981 | Ramsey et al. | 350/96.2 |
| 4,303,303 | 12/1981 | Aoyama | 350/96.2 |
| 4,322,126 | 3/1982 | Minowa et al. | 350/96.2 |
| 4,365,863 | 12/1982 | Broussaud | 350/96.15 |
| 4,431,258 | 2/1984 | Fye | 350/1.6 |
| 4,470,662 | 9/1984 | Mumzhiu | 350/96.15 |
| 4,498,730 | 2/1985 | Tanaka et al. | 350/96.16 |
| 4,574,191 | 3/1986 | Conrad | 250/203 |
| 4,603,975 | 8/1986 | Cinzori | 356/152 |
| 4,613,203 | 9/1986 | Proetel et al. | 350/6.6 |
| 4,614,868 | 9/1986 | Alster | 250/227 |
| 4,626,066 | 12/1986 | Levinson | 350/96.18 |
| 4,644,160 | 2/1987 | Arimoto et al. | 250/201 |
| 4,657,339 | 4/1987 | Fick | 350/96.2 |
| 4,714,326 | 12/1987 | Usui et al. | 350/485 |
| 4,738,500 | 4/1988 | Grupp et al. | 350/6.6 |
| 4,789,215 | 12/1988 | Anderson et al. | 350/96.19 |
| 4,790,621 | 12/1988 | Calaby et al. | 350/96.2 |
| 4,796,263 | 1/1989 | Rampolla | 372/10 |

(List continued on next page.)

FOREIGN PATENT DOCUMENTS

| | | |
|---|---|---|
| A 0066154 | 5/1980 | Japan . |
| 1-226228 | of 1989 | Japan . |
| A 0192233 | 8/1989 | Japan . |
| 2 221 810 | 2/1990 | United Kingdom . |

OTHER PUBLICATIONS

Dakin, J.P., Fibre Optics '84, SPIE vol. 468, 1984, pp. 219–225.

Henderson, W., Fibre Optics '89, SPIE vol. 1120, pp. 99–103.

*Primary Examiner*—Hemang Sanghavi
*Attorney, Agent, or Firm*—Holme Roberts & Owen LLP

[57] ABSTRACT

A fiber optical control system for use in an optical switch generally includes, in one embodiment, a fiber assembly (86), a signal separator (88), a sensor unit (90), a lens assembly (92), stationary mirror (94), targeting RED (96), moveable mirror assembly (98) with mounted alignment REDs (100), window (102) and a processor (104). The separator (88) separates the control signals from the communication signals so that the control signals are received by the sensor unit (90) and the communication signals are received by fiber (106). The control signals received by the sensor unit (90) provide target identification and alignment information for connecting target fibers. The moveable mirror assembly (98) includes moveable mirror surfaces (132) with related control elements and REDs (100) mounted on a housing (134). The assembly (98) is used to actuate both targeting and alignment adjustments. The mirror surfaces (132) move in response to commands from processor (104) to allow for adjustment of the optical path of the communication and control signals received through window (102) in two dimensions relative to the fiber (106) and sensor unit (90).

27 Claims, 26 Drawing Sheets

U.S. PATENT DOCUMENTS

| | | | |
|---|---|---|---|
| 4,814,600 | 3/1989 | Bergstrom | 250/221 |
| 4,823,402 | 4/1989 | Brooks et al. | 455/607 |
| 4,838,631 | 6/1989 | Chande et al. | 350/6.6 |
| 4,838,637 | 6/1989 | Torok et al. | 350/96.18 |
| 4,859,012 | 8/1989 | Cohn | 350/96.24 |
| 4,927,225 | 5/1990 | Levinson | 350/96.16 |
| 4,932,745 | 6/1990 | Blonder | 350/96.2 |
| 4,953,155 | 8/1990 | Tangonan et al. | 385/16 |
| 4,993,796 | 2/1991 | Kapany et al. | 350/96.15 |
| 5,005,934 | 4/1991 | Curtiss | 350/96.18 |
| 5,028,104 | 7/1991 | Kokoshvili | 350/91.15 |
| 5,030,004 | 7/1991 | Grant et al. | 356/153 |
| 5,031,987 | 7/1991 | Norling | 350/96.15 |
| 5,150,245 | 9/1992 | Smithgall | 359/117 |
| 5,199,088 | 3/1993 | Magel | 385/18 |
| 5,204,922 | 4/1993 | Wier et al. | 385/18 |
| 5,208,880 | 5/1993 | Riza et al. | 385/18 |
| 5,221,987 | 6/1993 | Laughlin | 359/222 |
| 5,271,075 | 12/1993 | Gfeller et al. | 385/20 |
| 5,291,324 | 3/1994 | Hinterlong | 359/135 |
| 5,317,659 | 5/1994 | Lee | 385/22 |
| 5,420,946 | 5/1995 | Tsai | 385/22 |
| 5,436,986 | 7/1995 | Tsai | 385/16 |
| 5,440,654 | 8/1995 | Lambert, Jr. | 385/17 |
| 5,453,827 | 9/1995 | Lee | 356/73.1 |
| 5,524,153 | 6/1996 | Laor | 385/16 |
| 5,546,484 | 8/1996 | Fling et al. | 385/16 |
| 5,594,820 | 1/1997 | Garel-Jones et al. | 385/22 |
| 5,627,669 | 5/1997 | Orino et al. | 359/156 |
| 5,629,993 | 5/1997 | Smiley | 385/22 |
| 5,647,033 | 7/1997 | Laughlin | 385/16 |
| 5,828,800 | 10/1998 | Henry et al. | 385/16 |

DETECTOR

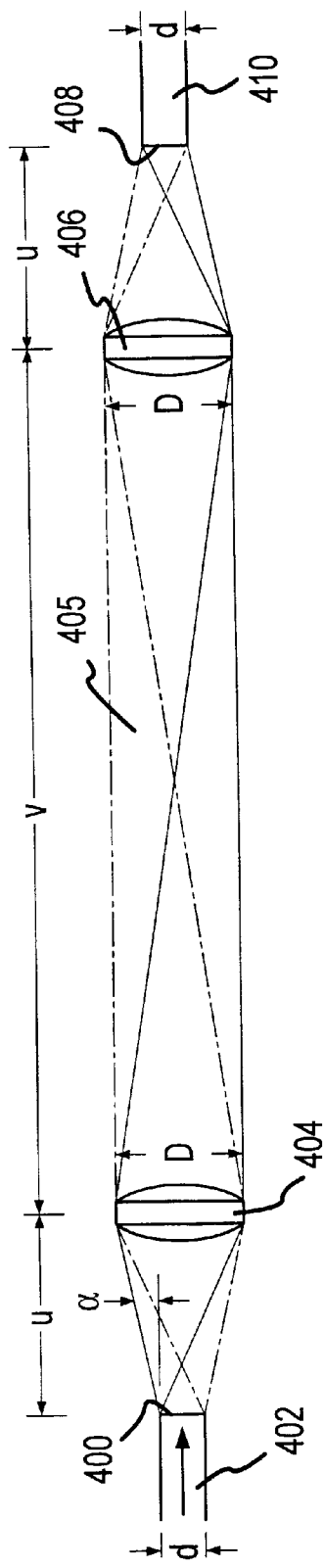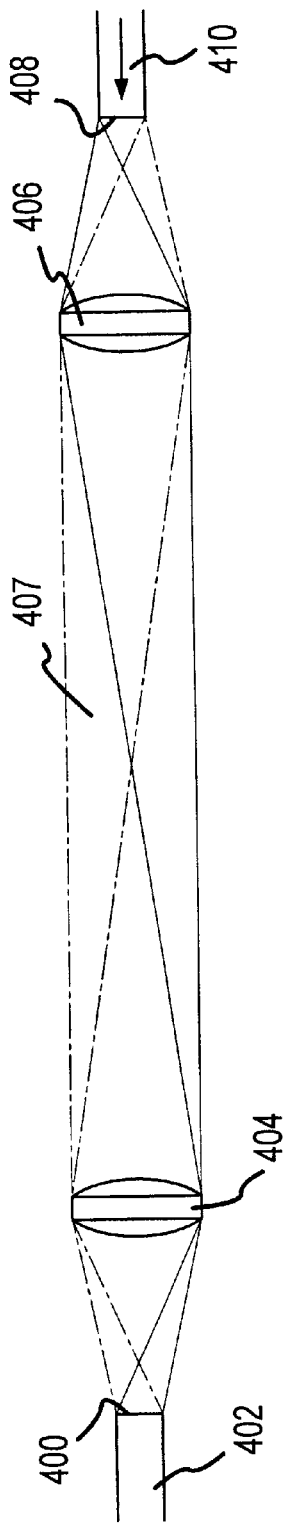
FIG.30A
FIG.30B

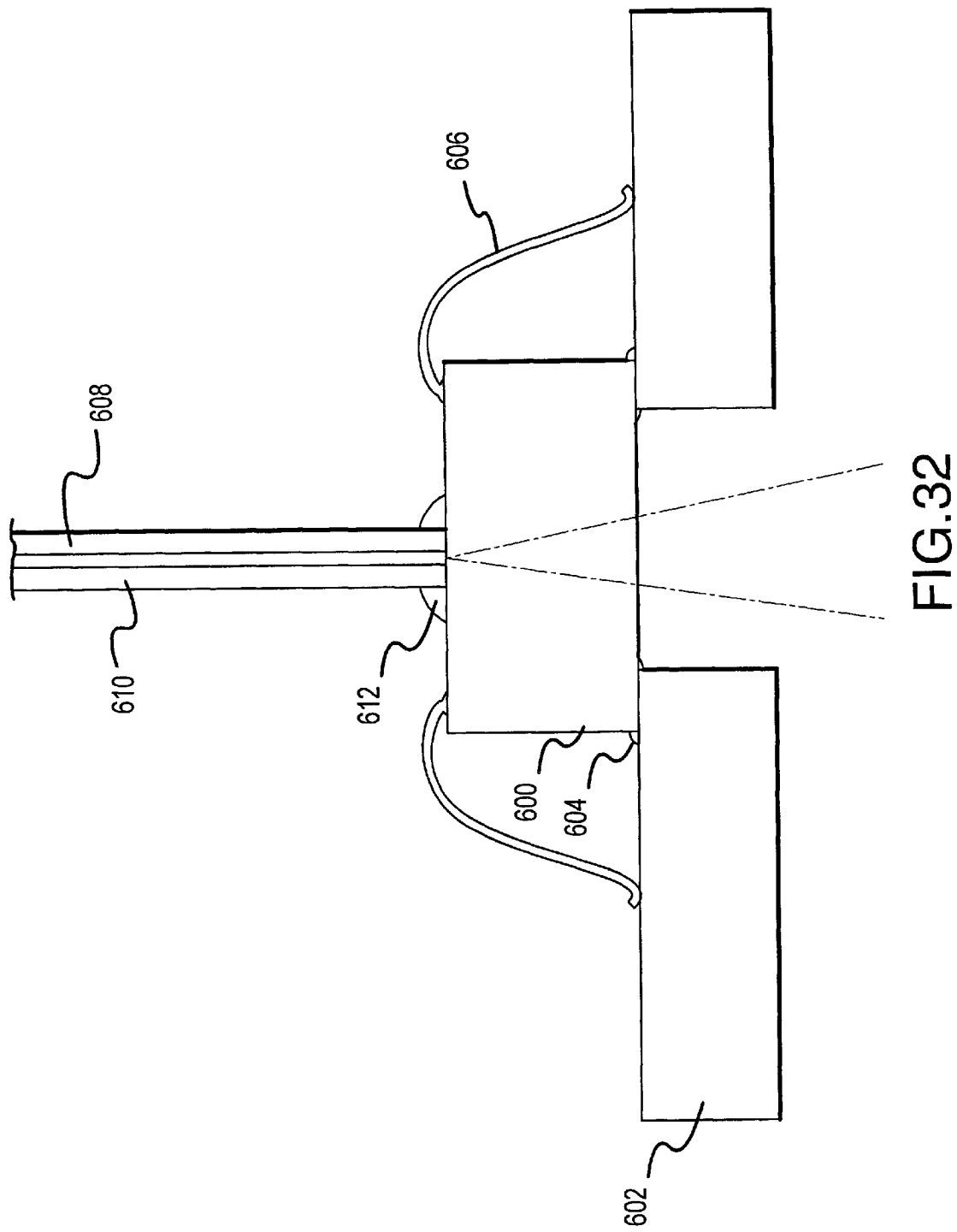

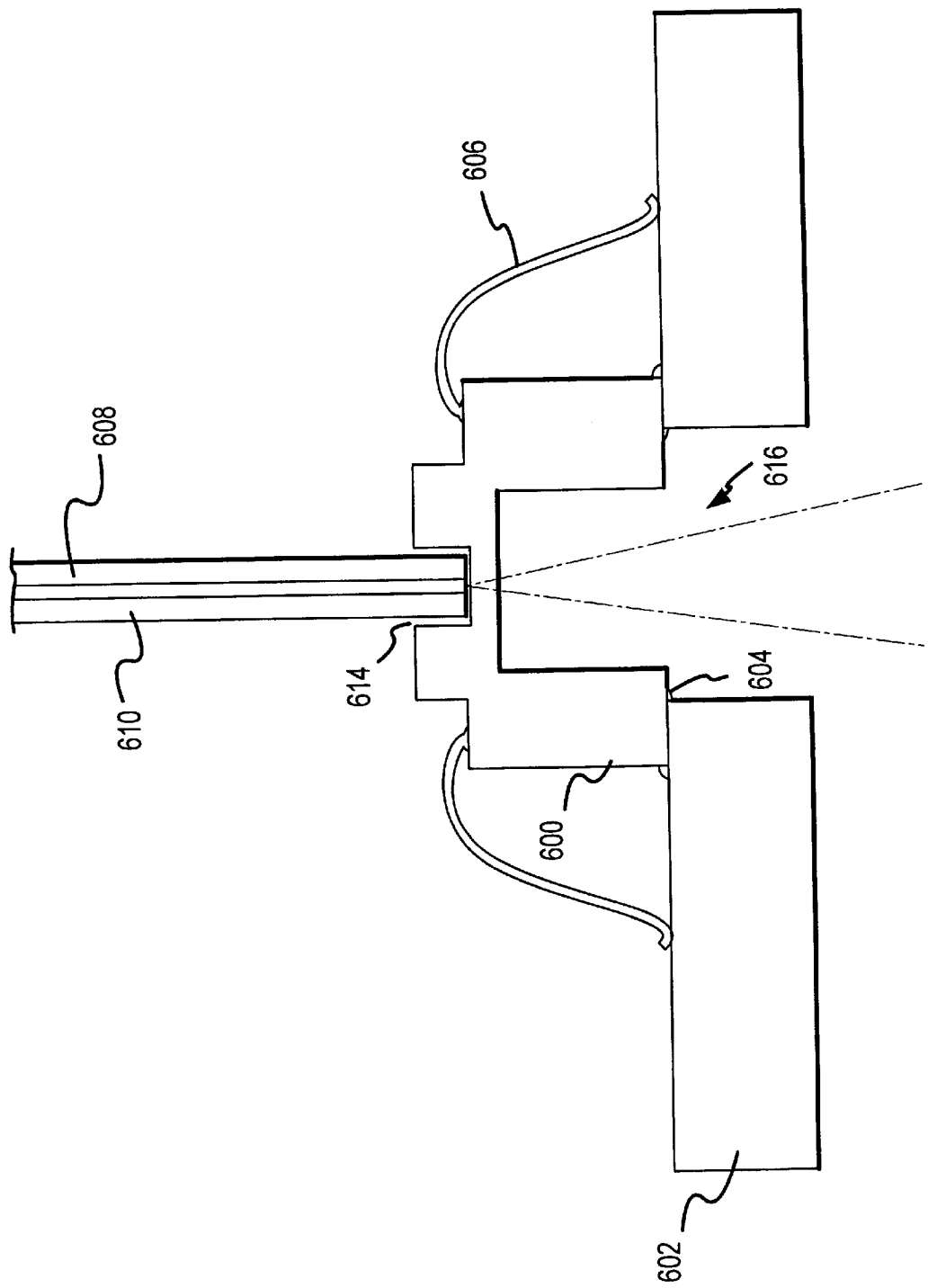

SENSING CONFIGURATION FOR FIBER OPTIC SWITCH CONTROL SYSTEM

FIELD OF THE INVENTION

The present invention relates, in general, to fiber optic switches that employ targeting control signals for aligning fibers to be connected for transmission of communication signals therebetween. In particular, the present invention is directed to a sensing configuration and related control system involving separation of the control signals from a communication signal pathway for enhanced off-path detection and control.

BACKGROUND OF THE INVENTION

Fiber optic systems are now in common use for transmitting optical communication signals i.e., optical signals modulated to encode desired information. The optical communication signals are transmitted across a network using optical fibers that support substantial transmission capacity with compact fiber bundles. Given the ever-increasing demands for improved signal quality and bandwidth, it is anticipated that the use of fiber optic communications will continue to increase for years to come.

One of the reasons that fiber optic networks have attracted attention in recent years relates to switching advantages. Because the communication signals in fiber optic networks are optical in nature, conventional electronic switching components can be eliminated. Instead, fiber optic communications lines are connected at a switch by carefully aligning the fiber ends of the lines to be connected for direct optical linkage. Such switching has proved advantageous in that switching can be accomplished quickly without unacceptable signal degradation. However, it will be appreciated that there is a continuous desire to increase the speed of operation and reduce signal losses at switch interfaces.

One of the most persistent challenges associated with optical switches is how to quickly and accurately align the fibers that are being connected, i.e., optically interfaced for signal communication therebetween. High speed is required to minimize lag times in the network. Accuracy is required to minimize signal losses. In this regard, it will be appreciated that even slight misalignments of the fiber ends will result in a significant loss of the power of the transmitted optical signal and, potentially, of the information encoded in the signal. Moreover, switch designers are continuously endeavoring to accommodate more fibers in smaller switches. Accordingly, alignment systems remain the focus of much research.

Conventional alignment systems typically employ radiation emitting devices (REDs), such as light or infrared radiation emitting diodes ("LEDs"), lasers or VCSEL lasers for fiber identification and alignment. Fiber identification relates to identifying the fibers that are to be connected for initial targeting and manipulating the switch targeting mechanisms so that the identified fibers are in rough optical alignment. In this regard, it will be appreciated that a typical switch includes a matrix of fiber ends on a first side of the switch and another matrix of fiber ends on a second side. Depending on the switch configuration, these matrices may optically interface directly, or via a folded optical path. In either case, it is generally a function of the switch to be able to optically connect any of the fibers on the first side to any of the fibers on the second side. The fiber identification process allows this connection to be initiated. Thereafter, a fiber alignment process fine tunes the connection to maximize signal transmission or minimize signal losses.

In order to facilitate the targeting and alignment processes, one or more REDs is typically mounted in known spatial relationship to each of the fibers of each matrix, e.g., adjacent to the fiber on the matrix structure. These REDs transmit radiation across the switch interface to the opposing matrix. In addition, an optical receiver is provided in conjunction with each fiber of each matrix. For example, the receiver may be incorporated into a cladding layer of a dual core optical fiber where the central fiber is used for transmission of communication signals. The receiver receives radiation from a RED or REDs of the opposing matrix and provides the received radiation to a detector/feedback system for controlling targeting. In this manner, the REDs can first be used to signal which of the fibers are to be connected. Thereafter, alignment can be optimized by analyzing the signal transmitted from the RED(s) associated with one of the target fibers to the receiver associated with the other and vice versa.

Although such conventional targeting and alignment systems have provided acceptable speed and accuracy, they impose certain limitations in switch designs. First, the REDs and receivers incorporated into the fiber matrices may limit the design of the array or impede array miniaturization. Moreover, the detectors used in such conventional systems generally include a large active area and a correspondingly low signal-to-noise ratio. The dual core fibers used for transmitting and receiving are also very expensive and difficult for switch manufacturers to reliably stock. It would therefore be advantageous to design a fiber optic switch that reduces or eliminates the need for dual core fibers and otherwise addresses limitations of conventional targeting and alignment systems.

SUMMARY OF THE INVENTION

The present invention is directed to a sensing configuration for a fiber optic control system, e.g., an optical targeting and/or alignment system, that involves separating the control signals from the communication signals. By virtue of such separation, the control signal receiving elements can be located away from the ends of the target fibers, thereby allowing for implementation without expensive and problematic dual core optical fibers. In addition, the sensing configuration allows for enhanced detector options for improved response and signal-to-noise ratio. The configuration, which may be implemented using stationary fiber ends in conjunction with targeting optics at the fiber interface, also allows for positioning the targeting REDs as well as the receiving elements outside of the fiber array areas, thereby providing increased array design options.

According to one aspect of the present invention, an off-path sensor is provided as part of a fiber optical control system for use in targeting and/or alignment. The fiber optical control system, which can be provided as part of a fiber optic switch, is used to configure an optical pathway at an interface between a first fiber end and a second fiber end so as to enhance optical communication therebetween. The interface is preferably folded for compactness, i.e., to reduce the interface dimension required for a given fiber-to-fiber optical path length. In this regard, the optical pathway between the fiber ends of a folded pathway embodiment is defined by optics such as lenses and mirrors. The control system includes a control signal source associated with the first fiber end for transmitting a control signal, an off-path sensor associated with the second fiber end for receiving the control signal and a processor associated with the off-path sensor for obtaining optical path configuration information based on the received control signals. The source preferably includes one or more REDs such as light emitting diodes or infrared radiation emitting diodes. The off-path sensor is located off of the optical pathway of the focused beam. Preferably, the sensor is located outside of the plane of the second fiber end. Corresponding sources and sensors may be provided in connection with both the first and second fiber ends to allow for two-sided control as desired. In addition, it will be appreciated that the control system may be implemented in connection with multiple fibers, e.g., of a fiber optic switch, for targeting and control. The sensor is thereby removed from the area of the fiber ends for enhanced sensor and overall control system design options.

According to another aspect of the present invention, an optical separator is provided as part of a fiber optical control system to separate control signals from communication signals. The control system includes a control signal source associated with a first fiber end for transmitting control signals along an optical pathway between the first fiber end and a second fiber end, a sensor disposed in known spatial relationship to said second fiber end for receiving the transmitted control signals, and an optical separator disposed on the optical pathway between the first and second fiber ends for separating the control signals and the communication signals such that the control signals are transmitted to the sensor and the communication signals are transmitted to the second fiber. The source, which may include one or more REDs, is located in known spatial relationship to the first fiber end relative to the optical pathway so as to provide an indication of first end position for control feedback. In this regard, the source may be located at or near a plane of the first end or at various other locations along the optical path between the fiber ends, for example, at or near a plane of a mirror or lens in a folded optical pathway embodiment. The optical separator preferably distinguishes, with a high degree of specificity, as between the communication signals and control signals, for example, based on wavelength or another optical characteristic, so as to separate the signals. For example, the separator may selectively direct the transmission and control signals on separate exit paths based on their respective distinguishing characteristics. In one embodiment, the separator includes a partially reflecting surface having wavelength-dependent reflection/transmission characteristic, for example, a pellicle mirror, such that one of the communication and control signals is reflected in large part to a transverse exit path and the other is transmitted in large part without reflection. In this manner, the sensor for receiving the control signals can be located separate from the second fiber end for enhanced design options.

According to another aspect of the present invention, the optical fiber control system of the present invention is incorporated into an optical switch. The optical switch includes a number of first side fibers and a number of second side fibers, where the first side fibers are optically interfaced with respect to the second side fibers across an optical interface area. In this regard, the first side fiber ends and second side fiber ends may be located, for example, on opposite sides of the interface area, on the same side of the interface area and offset from one another, or on the same side of the interface area and in the same area in an interspersed relationship. Similarly, the first side fiber ends and second side fiber ends may be connected via direct or folded (e.g., using mirrors) pathways. The optical fiber control system includes a control signal source and an off-path control signal sensor associated with each of the first and second side fibers, as well as a processing system for calculating control information based on sensed control signals. Preferably, the respective sources of the fibers can be operated for target identification and alignment. Target alignment preferably involves the use of control signals from a plurality of REDs, e.g., an array of four REDs, corresponding to each fiber. Such an array can provide alignment information in two dimensions. In order to provide target identification information, one or more dedicated targeting REDs may be associated with each fiber, or the alignment REDs can be operated to convey targeting as well as alignment information, for example, by modulating the alignment REDs to encode targeting information. Where the alignment REDs also convey targeting information, the targeting information and alignment information may be transmitted in separate, overlapping or the same time intervals.

According to yet another aspect of the present invention, separate sources and sensor are used for targeting and alignment. The associated fiber optic control system includes an alignment source and a targeting source associated with the first fiber end, an alignment sensor and a targeting sensor associated with a second fiber end, and a processor for computing targeting and alignment information based on respective targeting and alignment signals. The alignment and targeting sources are disposed in known, but different spatial relationship to the first fiber end relative to an optical pathway between the first and second fiber ends. Similarly, the alignment and targeting sensors are disposed in known, but different, spatial relationship to the second fiber end relative to the optical pathway. In particular, the sources and sensors are configured relative to the optical pathway and associated optics such that alignment signals from the alignment source are received by the alignment sensor and targeting signals from the targeting source are received by the targeting sensor. This separation of signals and sensors allows appropriate and cost effective sensors to be selected based on the requirements of their particular alignment or targeting function, e.g., spatial resolution, speed of operation and signal-to-noise requirements.

According to a still further aspect of the present invention, alignment of first and second optical fibers is conducted based on the location of incidence of control signals on a sensor surface. The corresponding fiber optic control system includes a source associated with an end of the first optical fiber for transmitting a control signal, a sensor having a sensor surface associated with an end of the second optical fiber for receiving the control signal, and a processor associated with the sensor for determining incidence information regarding a location of incidence of the control signal on the sensor surface and calculating alignment information based on the incidence information. The detector surface may be a single continuous surface or a partitioned surface. In the case of a continuous surface, the incidence information may be determined relative to differential outputs received at the surface corners or other locations in response to the incident signal. For a partitioned sensor surface, the incidence information may be determined by measuring/comparing the output from one or more of the partitions in response to the received signal. The control system thereby allows for accurate alignment with enhanced sensor options including reduced size sensor elements with an improved signal-to-noise ratio.

The present invention thus allows for fiber optic control without dual core fibers or control elements in the plane of the fiber ends to be connected. In this manner, the invention provides enhanced configuration and sensor design options for improved response and signal-to-noise ratio. Additional advantages will be apparent upon consideration of the following Detailed Description.

DESCRIPTION OF THE DRAWINGS

For a more complete understanding of the present invention and further advantages thereof, reference is now made to the following Detailed Description, taken in conjunction with the drawings, in which:

FIGS. 30A and 30B illustrate the operation of the focusing optics employed in accordance with the present invention; and FIGS. 31–33 illustrate alternative configurations of a beam directing unit in accordance with the present invention.

DETAILED DESCRIPTION

The fiber optic control system of the present invention is useful in a variety of contexts where it is desired to optically link opposing optical fibers. In the following description, the fiber optic control system is set forth in the context of certain N×N optical switch embodiments, i.e., switches for communication networks that selectively connect any of N first fiber lines with any of N second fiber lines. It will be appreciated, however, that various aspects of the invention have broader application.

The control system of the present invention preferably employs optical control signals to provide feedback for closed-loop servo-targeting/alignment control. In this regard, the control system involves subsystems for optical signaling, for signal detection, for determining desired optical path manipulations in response to detected control signals and for actuating the desired optical path manipulations. An important part of the present invention relates to an off-path detector configuration. However, it is believed that this configuration and the attendant advantages will be best appreciated upon gaining a full understanding of the optical switch environment and the various subsystems involved in targeting and alignment control. Accordingly, the following description includes: 1) a general discussion of the optical switch environment of the present invention; 2) a discussion of various optical signaling implementations; 3) a discussion of various optical signal detection implementations; and 4) a description of practical embodiments incorporating specific signaling and detection implementations in accordance with the present invention.

The Optical Switch

Figure 1A:
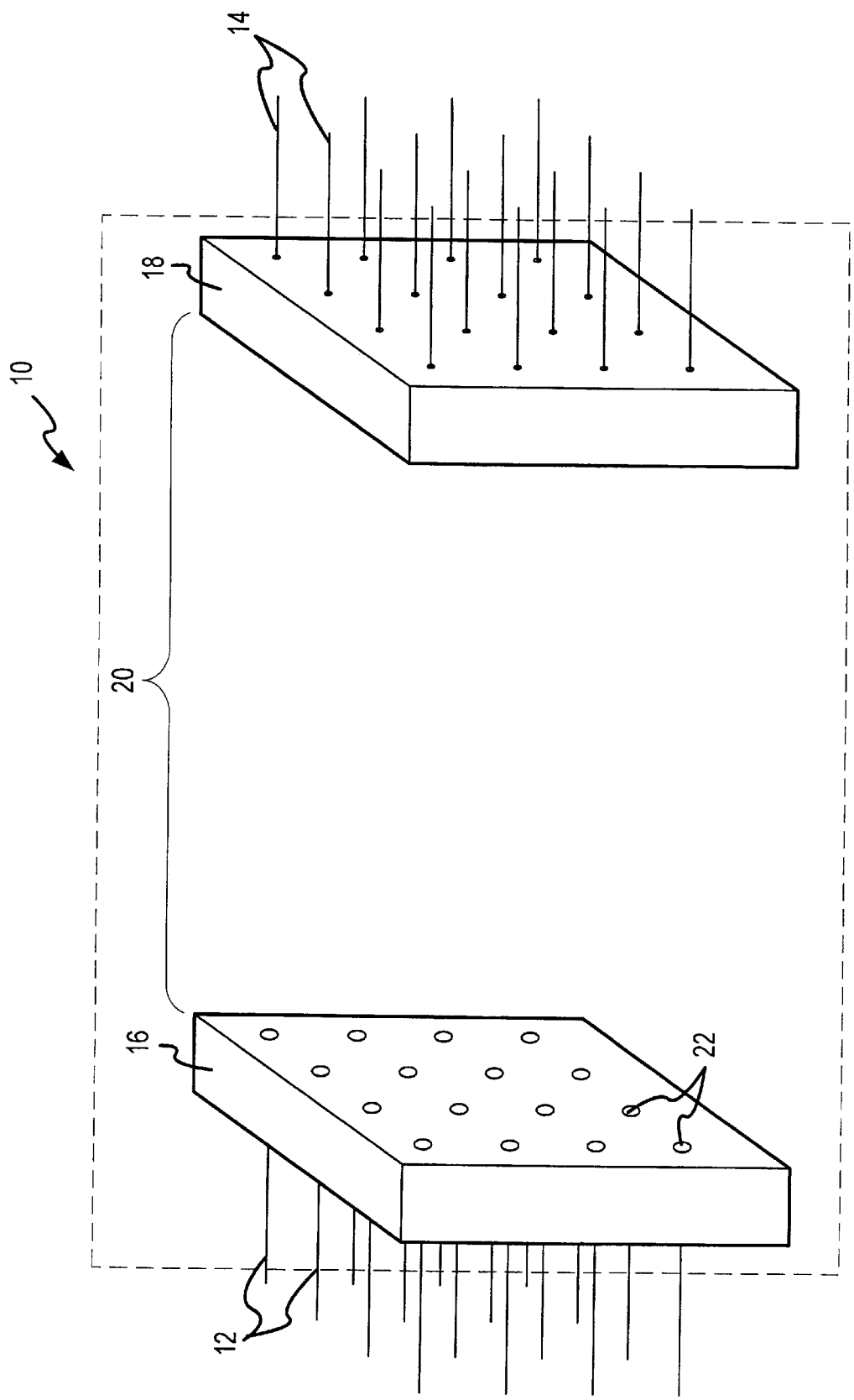
FIGS. 1A–1C are schematic diagrams of exemplary fiber optic switch connections in connection with which the control system of the present invention may be implemented.
Figure 1B:
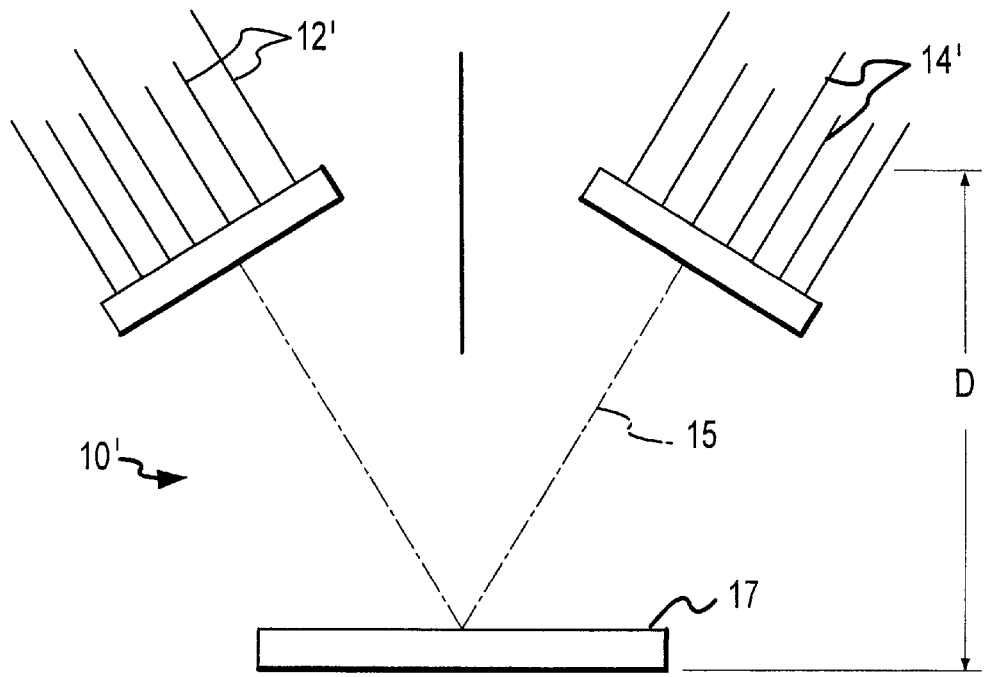
Figure 1C:
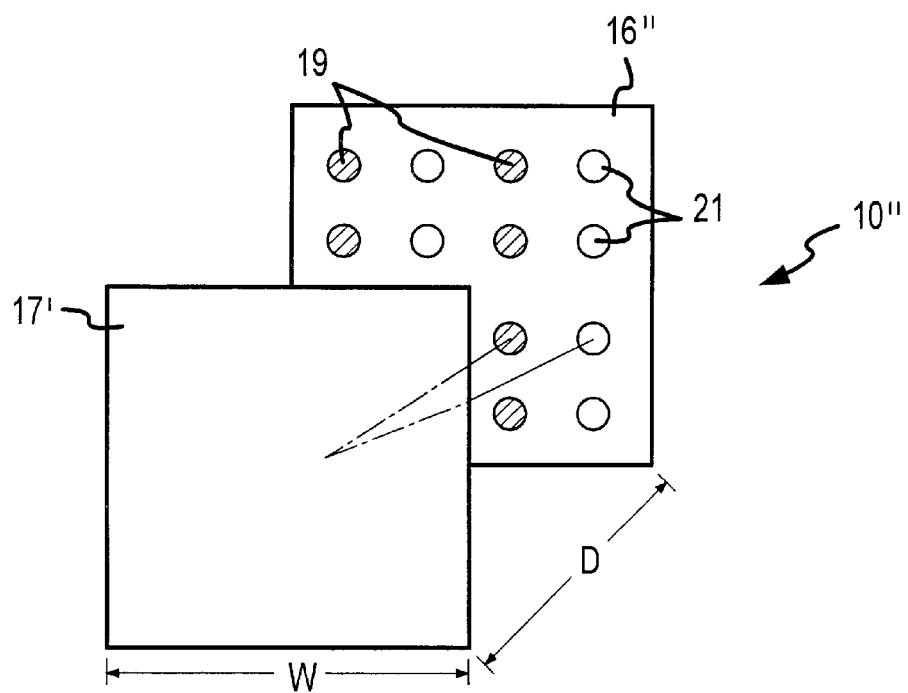

Referring to the Figures, FIGS. 1A–1C are schematic diagrams showing examples of possible configurations of N×N optical switches in connection with which the control system of the present invention may be implemented. Each of the illustrated embodiments depicts a 16×16 switch, although practical embodiments may include less or substantially more, e.g., 256×256, possible line connections. FIG. 1A shows an opposing chassis configuration for a switch 10. The switch 10 allows for selective connection between any of the first side lines 12 and any of the second side lines 14. Such connections allow for bi-directional communication of information (e.g., voice, video, data) as between the connected lines 12 and 14. Each of the lines generally includes an optical fiber for optically transmitting information as pulses of light or other electromagnetic radiation. It will thus be appreciated that the switch 10 can be part of a communication network.

Additional features of the switch 10 can be understood by reference to the schematic diagram of FIG. 1A. In this regard, the illustrated switch 10, includes first 16 and second 18 optical chassis separated by a transmission area 20. Each chassis includes windows 22 associated with lines 12 or 14 such that optical signals can be transmitted across the transmission area 20 to effect a "connection" and allow optical signal communication as between any of the lines 12 and any of the lines 14. Although the chassis 16 and 18 are illustrated in opposing relationship, it will be appreciated that other physical arrangements, such as noted below, and associated folded optical pathways (e.g., using lenses and mirrors) may be utilized. Similarly, even in the case of an opposing chassis configuration, folded optical pathways may be utilized to reduce the dimensions of the switch 10 for a given optical pathlength across the transmission area.

FIG. 1B shows an alternative, side-by-side configuration for a switch 10'. Again, the switch 10' allows for selective connection between any of the first side lines 12' and any of the second side lines 14'. Such connections are effected via a folded optical pathway, generally indicated by phantom line 15, using a mirror 17. In this regard, it will be appreciated that the "first side" and "second side" of the switch 10' are defined relative to a signal transmission pathway and are not necessarily spatially opposite sides. The illustrated folded configuration may be used, for example, to reduce the depth, D, of the switch 10'.

FIG. 1C shows a further alternative, interspersed configuration for a switch 10". The switch includes a single chassis 16" and a mirror 17'. Within the chassis 16", the first and second side lines are interspersed in the rows of a matrix configuration. In the illustration, for example, the first side lines may be associated with the shaded windows 19 and the second side lines may be associated with the unshaded windows 21. Such a configuration may be employed to reduce both the depth, D, and the width, W, of the switch 10". Although only three configurations have been shown and described, it will be appreciated that other configurations are possible.

The control system of the present invention allows for selection and targeting of optical pathways across a switch, such as switches 10, 10' and 10" as well as alignment of the lines to be connected. It will be appreciated that the process for making a connection between a selected one of the first side lines and a selected one of the second side lines requires that the associated optical transmission/reception elements be targeted at and aligned with one another. Typical system requirements specify that optical losses across the switch should be minimal. Consequently, accurate targeting and alignment is of significant importance. Moreover, speed of switch operation is an important consideration and rapid targeting and alignment is therefore highly desirable. In addition, compact construction is an important consideration. The control system of the present invention as set forth below addresses these concerns.

Optical Signaling

In particular, the control system of the present invention employs a number of radiation emitters, such as radiation emitting diodes (REDs), associated with each of the first and second side lines. These REDs, which may emit infrared radiation, are used in a coordinated manner to quickly 1) identify the targeted lines (first side and second side) and 2) provide closed-loop feedback for servo-targeting/alignment control. In this context, targeting refers to signaling to identify the lines that are to be connected and manipulating the appropriate control elements (as will be described below) to roughly configure an optical pathway between the lines so as to effect a connection. Alignment refers to fine-tuning the connection for optimized communication signal transmission. The immediately following description sets forth a number of implementations for targeting and alignment signaling. These generally involve: 1) using the same REDs for targeting and alignment signaling; 2) using dedicated REDs for targeting and separate dedicated REDs for alignment; 3) conducting target signaling and alignment signaling in separate, overlapping or the same time intervals; and 4) implementing the signaling in a pulsed or digital format or by way of signal modulation (i.e., frequency modulation). It will be appreciated that other implementations are possible in accordance with the present invention.

Figure 2:
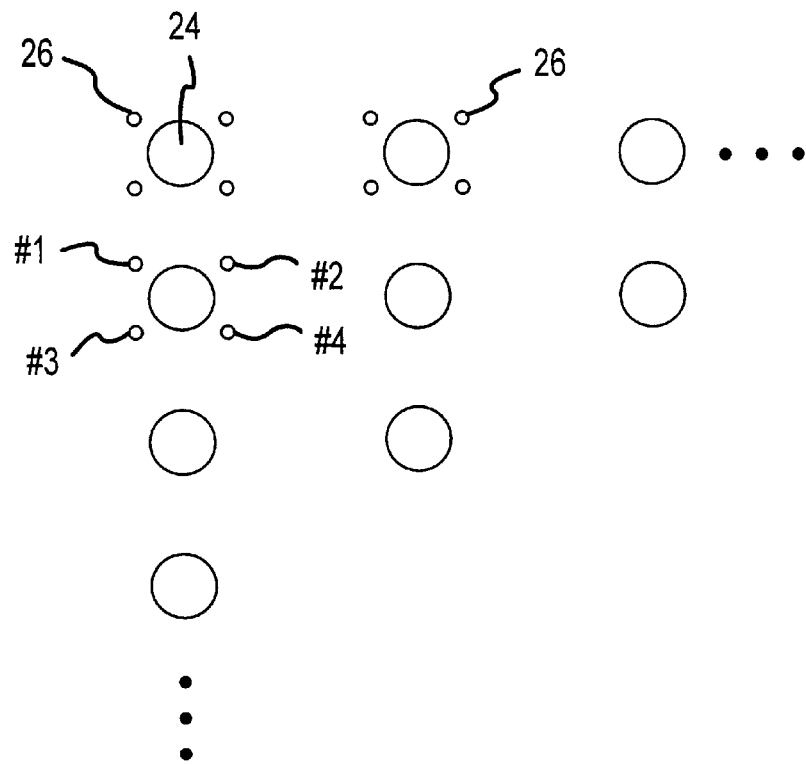
FIG. 2 illustrates the spatial relationship between REDs and fiber ends in accordance with the present invention.

FIG. 2 generally represents a front or end-on view through one of the illustrated chassis, e.g., chassis 16 (FIG. 1A). That is, the vantage point of FIG. 2 is generally aligned with optical pathways between the chassis. Each of the fiber lines in chassis 16 is associated with a fiber end 24 and, typically, a lens for focusing radiation entering/exiting the associated line. For present purposes, the illustrated rows and columns of fiber ends 24 may be thought of as spatially corresponding to the rows and columns of lines 12. In the embodiment of FIG. 2, each fiber end 24 is surrounded by four REDs 26. The dimensions of the fiber ends 24 may vary from switch to switch or as between individual fibers of a switch. In FIG. 2, the fiber ends 24 are significantly magnified as they may appear through lenses for focusing signals onto the fiber ends 24 and focusing signals transmitted by fiber ends 24. It will be appreciated that the fiber ends 24 and REDs may be located at different positions (e.g., depths relative to the vantage point of FIG. 2) along their common optical path so long as the REDs have a known spatial relationship to the associate fiber end 24 relative to the optical path. As will be understood from the description below, each of the lines 12 and 14 also includes a radiation sensor or sensors for receiving radiation from the REDs. By comparing the signals received at a targeting line 12 or 14 from the REDs of a targeted line 14 or 12, e.g., the locations of incidence on a sensor of the signals from the various REDs, feedback information can be derived to better align the optical transmission pathway relative to the targeted/targeting lines 12 and 14. In this regard, the targeted and targeting lines 12 and 14 can be adjusted cooperatively and simultaneously for optimal transmission.

Figure 3:
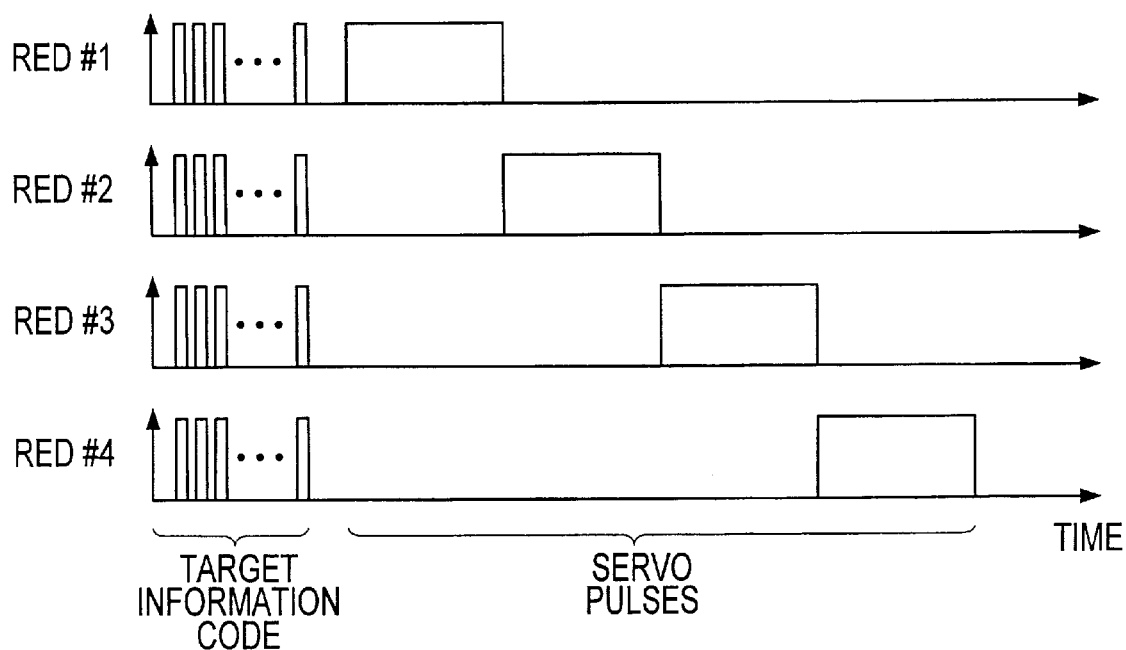
FIG. 3 is a graph illustrating a RED pulsing sequence for targeting and alignment in accordance with the present invention.

In one implementation corresponding to the illustrated four RED per fiber line configuration, the control system of the present invention uses controlled pulsing of the REDs for both target selection/identification and servo-targeting/alignment control. FIG. 3 illustrates an appropriate pulsing sequence for the four REDs associated with a targeted line. The pulse profiles shown correspond to on/off cycling of the REDs over time to effectively provide digital signaling. As shown, in this implementation, all four REDs are first pulsed simultaneously (i.e., during a first time period) to identify the target, i.e., the fiber end and/or focusing lens with which the REDs are associated. In this regard, the initial pulse sequence can convey a target identification code. Thereafter, the four REDs are pulsed sequentially for servo-alignment control that identifies the location of the associated fiber. The coding may be, for example, a simply binary code, a Manchester code or any other code sufficient to provide the target identification information. In this manner, both target identification and alignment control are effected quickly using signals from the four REDs. It is noted that prior target identification schemes have required a long series of column and row identification signals involving sequentially coordinated pulsing of the N×N array.

Figure 4:
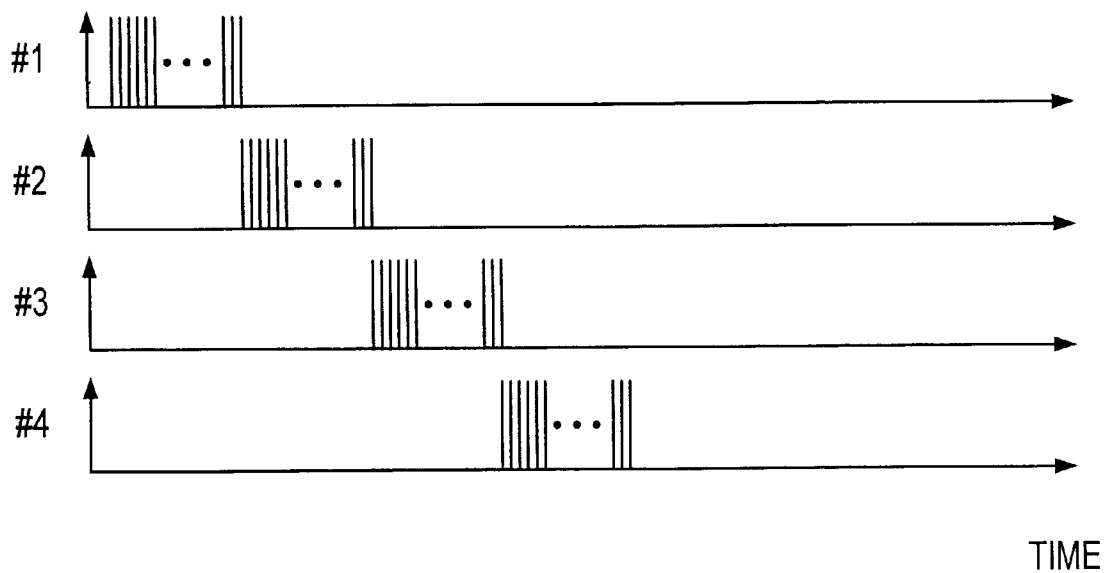
FIG. 4 is a graph illustrating an alternative RED pulsing sequence for targeting and alignment in accordance with the present invention.

FIG. 4 illustrates an alternative pulsing sequence where the servo-control pulses are modulated to convey target identification information. That is, the four REDs are operated in sequential time periods for alignment purposes. Within the time period that a particular RED is operated, it is pulsed to convey a target identification code. In this manner, the targeting and servo-control functions are combined for possibly faster operation.

Figure 5:
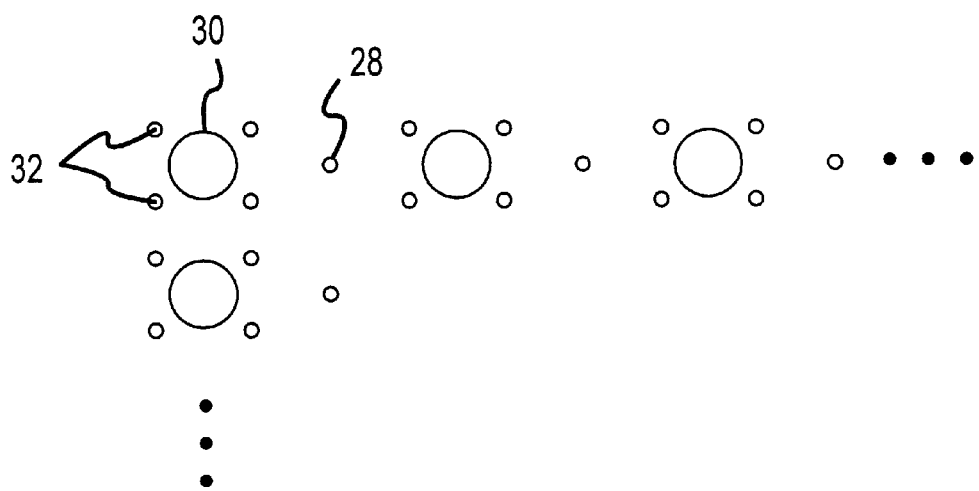
FIG. 5 illustrates an alternative arrangement of REDs and fiber ends in accordance with the present invention.

FIG. 5 shows an alternative fiber/RED configuration for use in target identification and alignment control. In the illustrated embodiment, a fifth RED 28 for each fiber end 30 is provided for target identification separate from the four alignment control REDs 32. It will be appreciated that the illustrated fiber ends 30, servo-alignment control REDs 32 and the target identification RED 28 may be located at different positions (e.g., depths relative to vantage point of FIG. 5) along their common optical path. In addition, the dimensions of the fiber ends 30 may vary from switch to switch or as between fibers of a switch. The alignment control REDs 32 and target identification RED are disposed in known, but different, spatial relationship to the corresponding fiber end 30 relative to the associated optical pathway, thereby allowing for separate detection of the target identification and alignment signals. This embodiment is further associated with alternative sensor configurations as described below.

Figure 6:
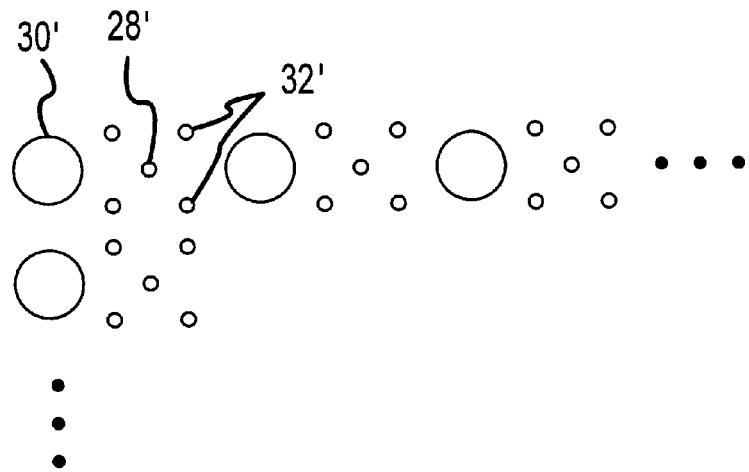
FIG. 6 is a further alternative arrangement of the REDs and fiber ends in accordance with the present invention.

FIG. 6 shows a further alternative fiber/RED configuration involving a fifth RED 28' for separate target identification. In the embodiment of FIG. 6, the four (per fiber) servo-alignment control REDs 32', as well as the target identification REDs 28' are spatially offset from the fiber ends 30' relative to the optical paths associated with the fiber ends 30'. It will thus be appreciated that no particular arrangement of the alignment REDs 32' relative to the fiber ends 30' or target identification REDs 28' is required, provided that the spatial relationship between the REDs 32' and fiber ends 30' relative to the optical pathway is known.

Figure 7:
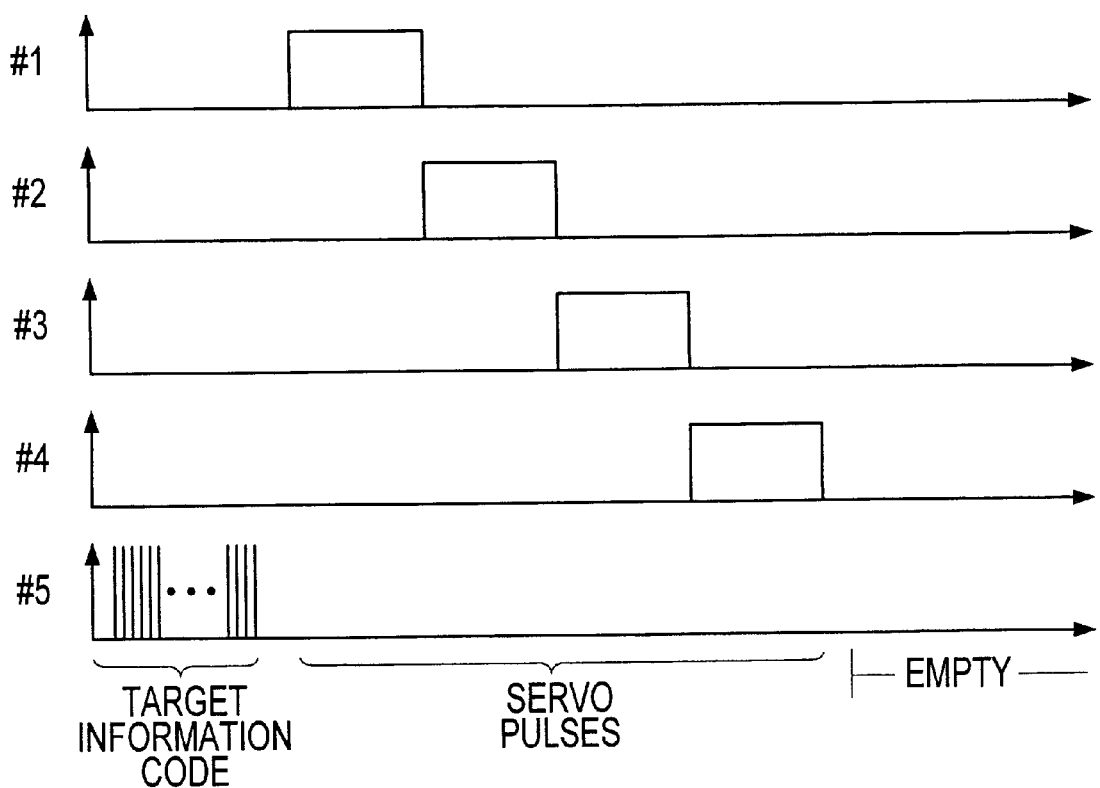
FIG. 7 illustrates a five RED pulsing sequence for targeting and alignment in accordance with the present invention.

FIG. 7 shows a pulsing sequence for target identification and servo-alignment control using a five RED/fiber end arrangement such as illustrated in FIGS. 5–6. The REDs designated #1, #2, #3 and #4 in FIG. 7 generally correspond to the servo-alignment REDs 32 or 32' of FIGS. 5 or 6 and the RED designated #5 generally corresponds to target identification REDs 28 or 28'. As shown, the pulse sequence is initiated by a pulsed target identification code by RED #5. Thereafter, REDs #1–#4 are pulsed sequentially for alignment control.

Figure 8:
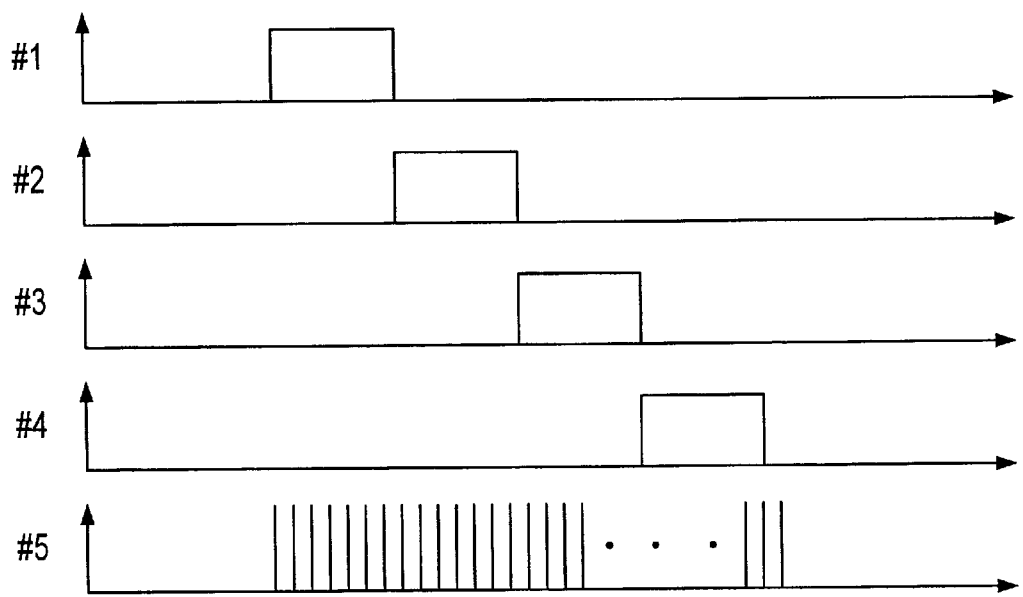
FIG. 8 illustrates an alternative five RED pulsing sequence for targeting and alignment in accordance with the present invention.

FIG. 8 shows an alternative pulsing sequence for a five RED/fiber end arrangement where the pulsed target identification code and servo-targeting control pulses are transmitted in simultaneous or temporally overlapping relationship. It will be appreciated that the pulsed target identification code can be readily distinguished from the sequential servo-alignment control pulses as these pulse sets can be separately detected as described below.

Figure 9:
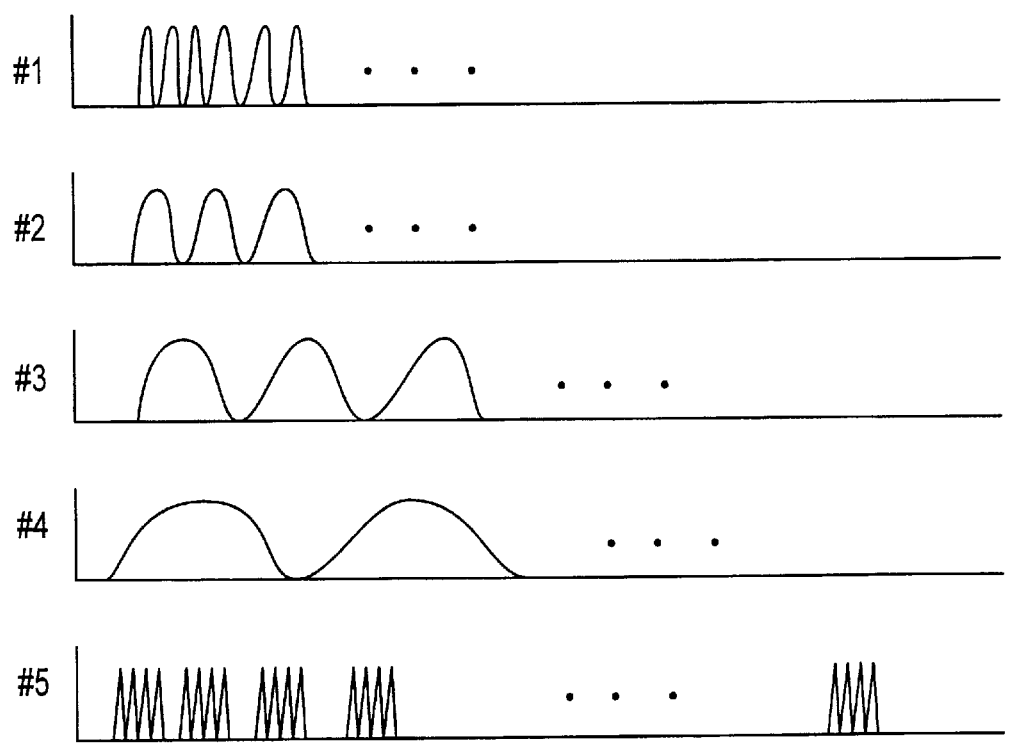
FIG. 9 illustrates a frequency modulated implementation for five RED targeting and alignment in accordance with the present invention.

FIG. 9 shows an alternative signaling implementation for a five RED/fiber end arrangement where the pulses from all five of the REDs are transmitted in simultaneous or temporally overlapping relationship. In this implementation, the pulses of the various REDs #1–#5 can be distinguished by the sensor or sensors because they are modulated at differing frequencies. For example, the various signals can be resolved through appropriate signal analysis or by use of band pass filters or the like to separate a resulting composite signal into its constituent frequency-related components. Based on the foregoing examples, it will be understood that many signaling implementations are possible with respect to the number of REDs, the arrangement of REDs, the use of common or dedicated REDs for target identification and alignment, the temporal relationship between the transmitted target identification and alignment signals and the way of encoding information into the signals.

Signal Detection

From the foregoing discussion, it will be appreciated that the control signals (i.e., the target identification and alignment signals) and the communication signals (the signals carried by the fiber lines) are generally transmitted along a common pathway within the switch interface, or along pathways having a known spatial relationship to one another. Indeed, the relationship between the control signal pathway and communication signal pathway is an integral part of the desired closed-loop servo-control system. An important part of a preferred control system of the present invention relates to separation of the control signals and communication signals. In particular, it is desirable that the control signals and communication signals travel along closely related paths, for example, involving the same mirrors, lenses and other optics, thereby eliminating sources of control error due to optical path differences. However, it has been found that it is also useful to separate the control signals from such a common optical pathway for detection so as to enhance detector design options and performance.

Figure 10:
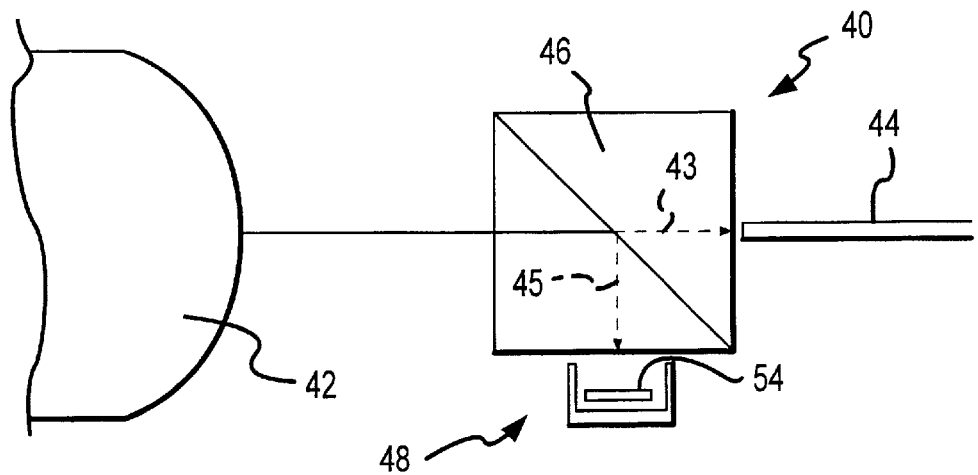
FIG. 10 shows a side view of an off path sensor arrangement in accordance with the present invention.

This separation can be implemented by a detector unit including an off-path sensor. An embodiment of such a unit 40 is schematically illustrated in FIG. 10. The unit 40 includes a lens 42 for focusing radiation entering/exiting a fiber line 44 at the switch interface. In the illustrated embodiment, a signal separator 46 is disposed between the lens 42 and fiber line 44 for separating incident signals, on a wavelength dependent basis, between a first, communication pathway, generally indicated by arrow 43, from the lens 42 to the line 44 via separator 46 and a second, detection pathway, generally indicated by arrow 45, from the lens 42 to a sensor assembly 48 via the separator 46. Different wavelength bands can be used for targeting signals and communication signals such that the separator 46 selects between the first and second paths based on wavelength. For example, where the communication signals are transmitted as infrared radiation having a wavelength of at least 1310 nm ($\lambda > 1310$ nm), the REDs may be near infrared radiation emitting diodes ($\lambda < 1310$ nm) or light emitting diodes (for emitting visible spectrum radiation). In this regard, the communications signals may have wavelengths of 1310 and/or 1550 nm, and the REDs may have wavelengths of 880 and/or 950 nm.

Figure 11:
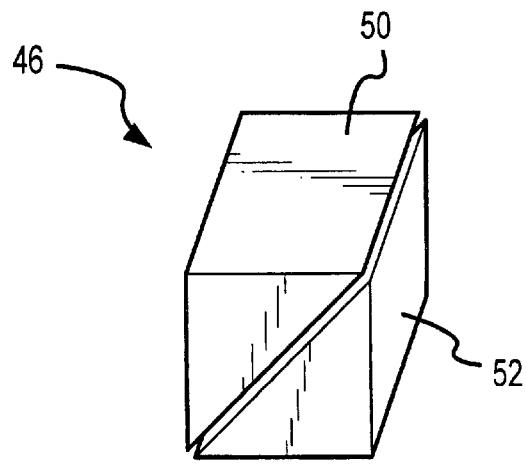
FIG. 11 is a perspective view of the mirror block of FIG. 10.
Figure 12:
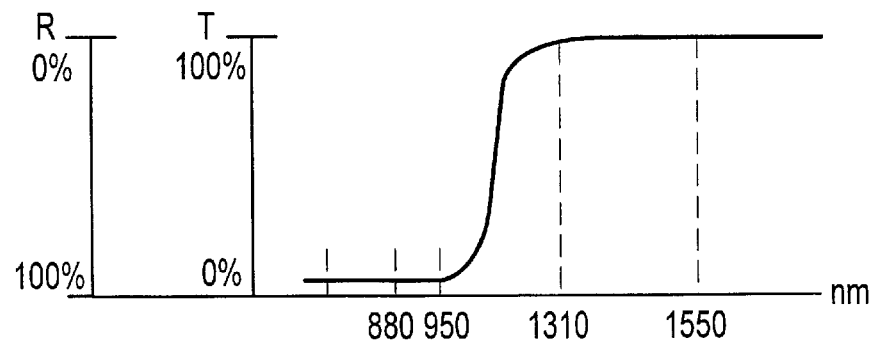
FIG. 12 is a graph depicting the wavelength response of the mirror block of FIG. 11.

In this regard, the signal separator 46 can be, for example, various types of dichroic beam splitters such as a beam splitter cube, a coated filter or a pellicle-based filter. The illustrated separator 46, as best shown in FIG. 11, is a beam splitter cube formed from two prismatic elements 50 and 52. At least one of the faces at the interface between the elements 50 and 52 can be coated such that the splitter has a filtering/reflecting response as generally illustrated in FIG.

12. It will be appreciated that the control signal wavelengths for this embodiment can be selected to be in the wavelength range below about 1000 nm whereas the communication signals will be in the wavelength range above about 1200 nm.

FIGS. 13–17 show a number of possible configurations for the radiation-sensitive surface(s) of sensor assembly 48. The radiation-sensitive or sensor surfaces may be formed from any of various near infrared sensitive materials for providing an electrical signal in proportion to an incident radiation signal. The electrical signals can be read-out from the sensor surface by using electrodes as is well-known. The partitions in the sensor surfaces as discussed below are formed by electrically isolating portions of the sensor surfaces such that the signals from the various partitioned areas can be separately detected. Alternatively, CCD-based detectors or any other appropriate sensor systems may be employed. It is preferred to use a silicon-based detector, as these are generally sensitive below 1100 nm and not sensitive above 1200 nm, so stray radiation from the communication signal will not substantially influence it.

Figure 13:
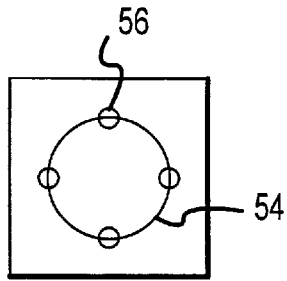
FIG. 13 is a top view showing a sensor design in accordance with the present invention.

FIG. 13 shows a configuration employing a single, continuous sensor surface 54 for use in connection with a four RED/fiber embodiment as described above. Images 56 of the four REDs fall on an edge of the sensor surface 54 when the associated fiber line is properly aligned such that signals of substantially equal strength are received from each of the REDs. For example, Referring to FIGS. 2, 10 and 13, where the REDs are arranged around the fiber end relative to the associated optical pathway as shown in FIG. 2, the location of sensor surface 54 relative to pathway 45 generally corresponds to the location of fiber 44 relative to path 43. Moreover, the detector surface 54 can be located such that paths 43 and 45 are substantially equal in length. In this manner, lens 42 focuses communication signals substantially on the plane of the fiber end and focuses control signals substantially in the plane of the sensor surface.

The detector surface 54 is read out to provide output signals indicative of the received optical signals from the four REDs. In this regard, the signals from the various REDs may be distinguished due to, for example, differing frequency modulations. The relative strengths of the output signals can then be analyzed by a processor to obtain the encoded target identification information and alignment information. More particularly, the encoded information is used to determine the position of the fiber to be targeted and the optical pathway for the connection is roughly configured to form the optical connection. The signals from the REDs are then analyzed for alignment purposes. In this regard, if a signal from a given RED is very strong in relation to its diametrically opposed RED (relative to surface 54), the processor would be able to determine that an alignment correction was required relative to a corresponding axis. Such a correction can be related to a particular correction to be implemented, for example, by bending the end of a fiber using a piezoelectric bender to vary a signal transmission angle or moving a mirror within the switch interface to redirect the signal transmission pathway. The required correction is determined based on knowledge of the RED positions relative to the signal transmission pathway, as well as the spatial relationship between the detector surface 54 and the associated fiber end. It will be appreciated that the four REDs (arranged in two opposing pairs) allow for convenient two-dimensional servo targeting and alignment control. The REDs may be arranged to provide control feedback directly correlated to, for example, two pivoting axes of a moveable mirror. The mirror may be constructed as a micro-machined chip mounted mirror surface, which is hinged or gimbaled to pivot about two orthogonal axes. Such pivotal motion is controlled by varying an electromagnetic field. Accordingly, control of the reflecting surface is actuated in response to appropriate electrical signals, based on analysis of the output signals from the detector, so as to vary the electromagnetic field at the reflecting surface, thereby pivoting the reflecting surface to the appropriate position to effect the required path correction. Such micro-machined, moveable mirrors are available, for example, from Texas Instruments.

Figure 14:
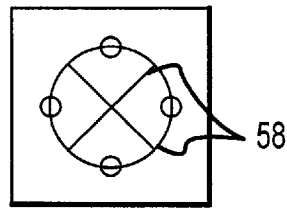
FIG. 14 is a top view showing an alternative sensor design in accordance with the present invention.
Figure 15:
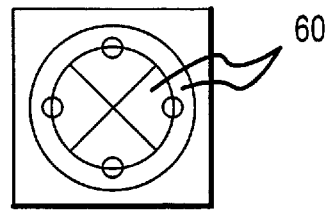
FIG. 15 is a top view showing a further alternative sensor design in accordance with the present invention.

In FIG. 14, four partitioned quadrant sensor areas 58 are employed for enhanced response and signal-to-noise ratio. In particular, the partitions allow for separately detecting the signals from the various REDs so as to better distinguish between such signals, and the smaller detector areas provide improved signal to noise ratio. FIG. 15 includes two partitioned sensor areas 60 per RED for further improved response. In this regard, it will be appreciated that substantially the entire cross-section of each of the control signals is incident on the partitioned sensor surface for improved optical efficiency. In addition, the two sensor areas per signal configuration allows for differential sensing, i.e., comparing the signal portion received by an inner sensor area to the signal portion received by the corresponding outer area to determine a radial location of incidence of the signal. The illustrated configuration implements smaller area sensor surfaces for improved signal to noise ratio. As described above, the output signals read out from the various sensor areas 58 provide an indication of the location of incidence of the optical signals from the various REDs. These incidence locations, in turn, provide feedback regarding the targeting/alignment state of the associated optical pathway. Appropriate pathway corrections can be implemented based on analysis of the received optical signals from the REDs.

Figure 16:
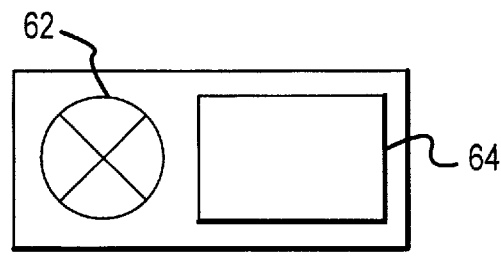
FIG. 16 is a top view showing a sensor design with separate targeting and alignment detector surfaces in accordance with the present invention.

FIG. 16 corresponds to a five RED embodiment as described above. The detector assembly 48 includes a quadrant sensor surface 62 for detecting signals from the four servo-alignment control REDs and a separate sensor surface 64 for detecting signals from the target identification RED. The quadrant sensor surface 62 provides alignment information as generally discussed above in connection with FIGS. 14–15. Sensor surface 64 receives a signal from a dedicated targeting RED that is offset relative to the alignment REDs such as shown, for example, in FIG. 5. The targeting sensor surface 64 can be somewhat larger than the alignment sensor surface 62 to assist in target searching. In this regard, it will be appreciated that noise may be less of a concern in connection with targeting and only rough optical path configuring is required. Preferably, the sensor surface is dimensioned to facilitate searching for a targeting signal from a targeting RED associated with a given fiber without detecting signals from targeting REDs associated with adjacent fibers. In addition, the sensor surface 64 may be designed to provide an indication concerning the location of incidence of the RED signal on the sensor surface 64. For example, such an indication may be obtained by comparing output signals detected at different read out electrodes. In this manner, preliminary feedback concerning alignment may be obtained to facilitate the alignment process using output from the alignment sensor surface 62.

Figure 17:
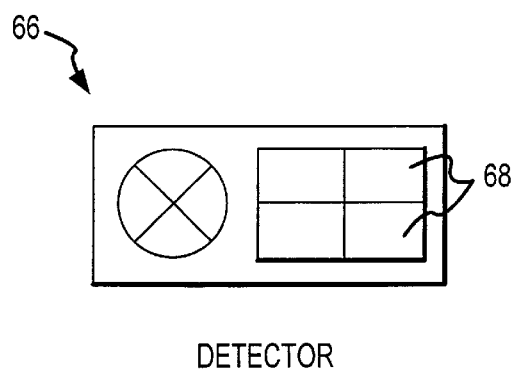
FIG. 17 is a top view showing an alternative sensor design employing separate targeting and alignment detector surfaces in accordance with the present invention.

In FIG. 17, the identification sensor assembly 66 includes multiple targeting sensor areas 68 for improved response, as well as course alignment. That is, by separately reading out the sensor areas, and based on knowledge of the spatial relationship between the targeting RED and the targeted fiber, an initial indication of alignment is provided. For example, if the targeting signal is received in equal portions by each of the sensor areas 68, this may indicate that the fibers to be connected are in close alignment, although feedback from the alignment REDs and sensor(s) would be useful in providing more accurate, two-dimensional alignment information. The illustrated partitioned targeting sensor surface also allows for reduction in targeting sensor noise. Moreover, it will be appreciated that, in the case of separate targeting and alignment sensors such as shown in FIGS. 16 and 17, different sensor designs and materials may be employed for the alignment and targeting sensors to reduce cost and/or accommodate the differing functional requirements of the respective sensors. These sensor design options are facilitated by the control system design including an off-path sensor configuration and a signal separator assembly as described below.

Figure 27A:
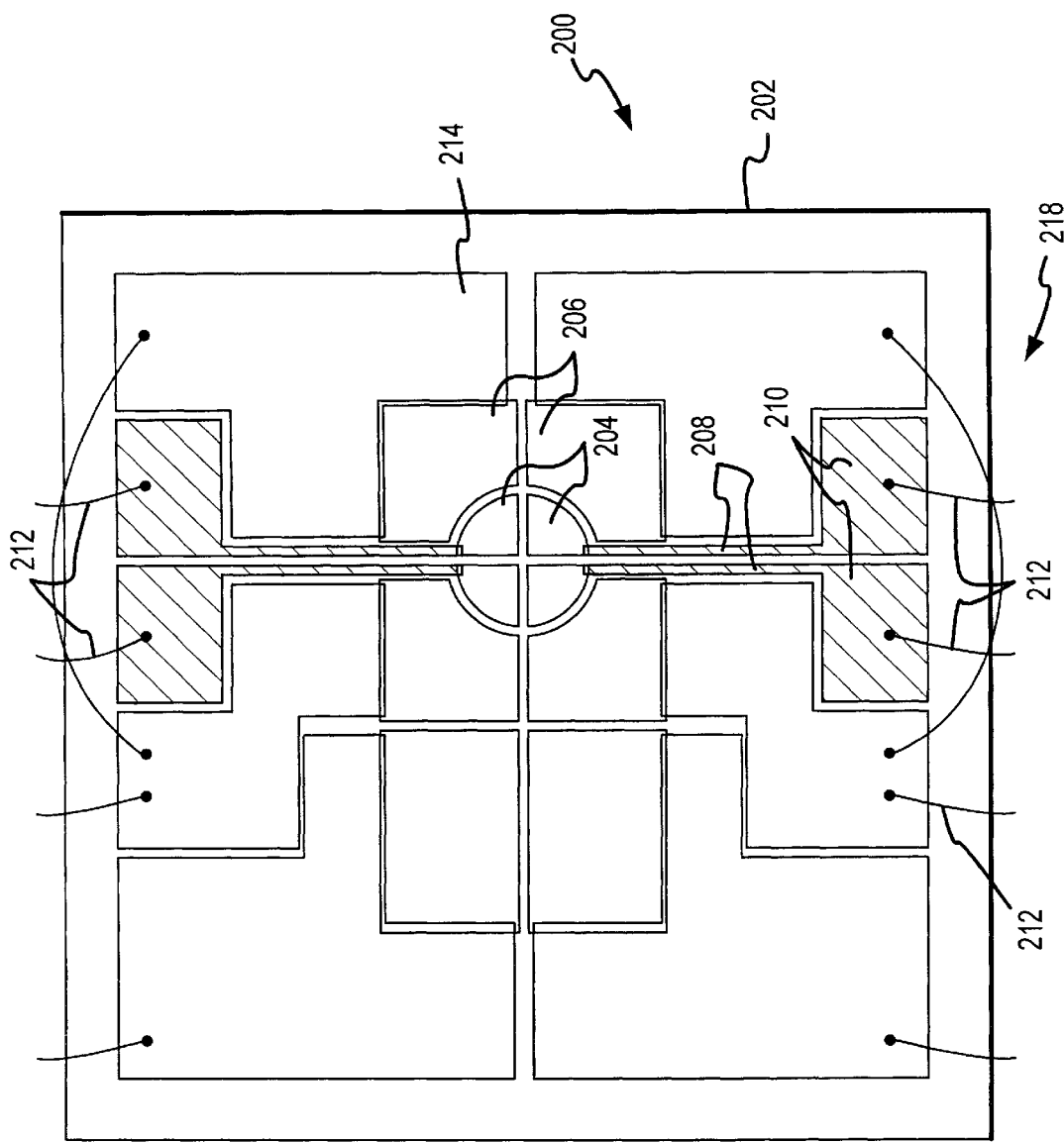
FIGS. 27A–27C show various sensor configurations for addressing the potential problem of sensor current resulting from signals impinging in the detector outside of the various sensor areas.
Figure 27B:
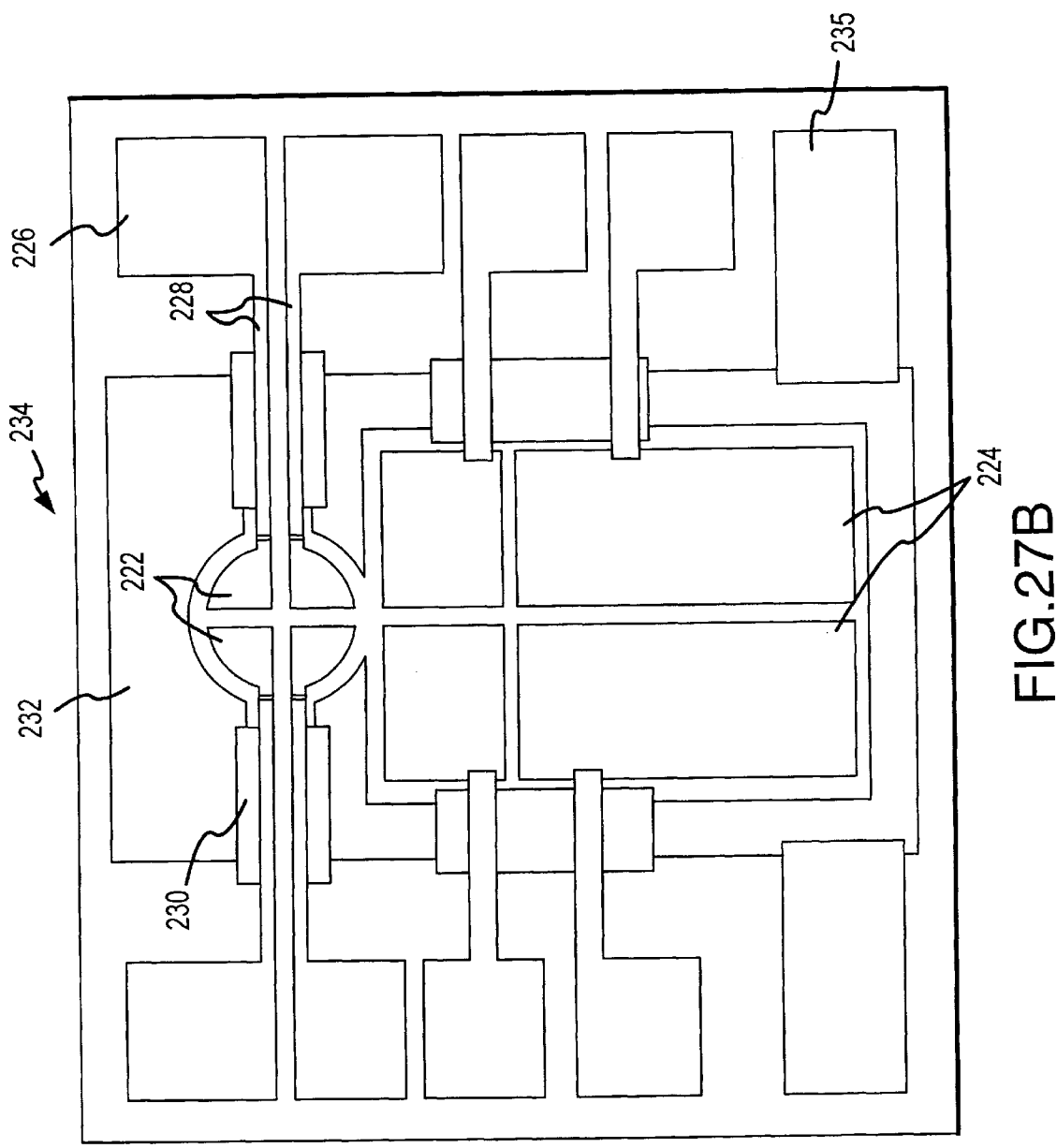
Figure 27C:
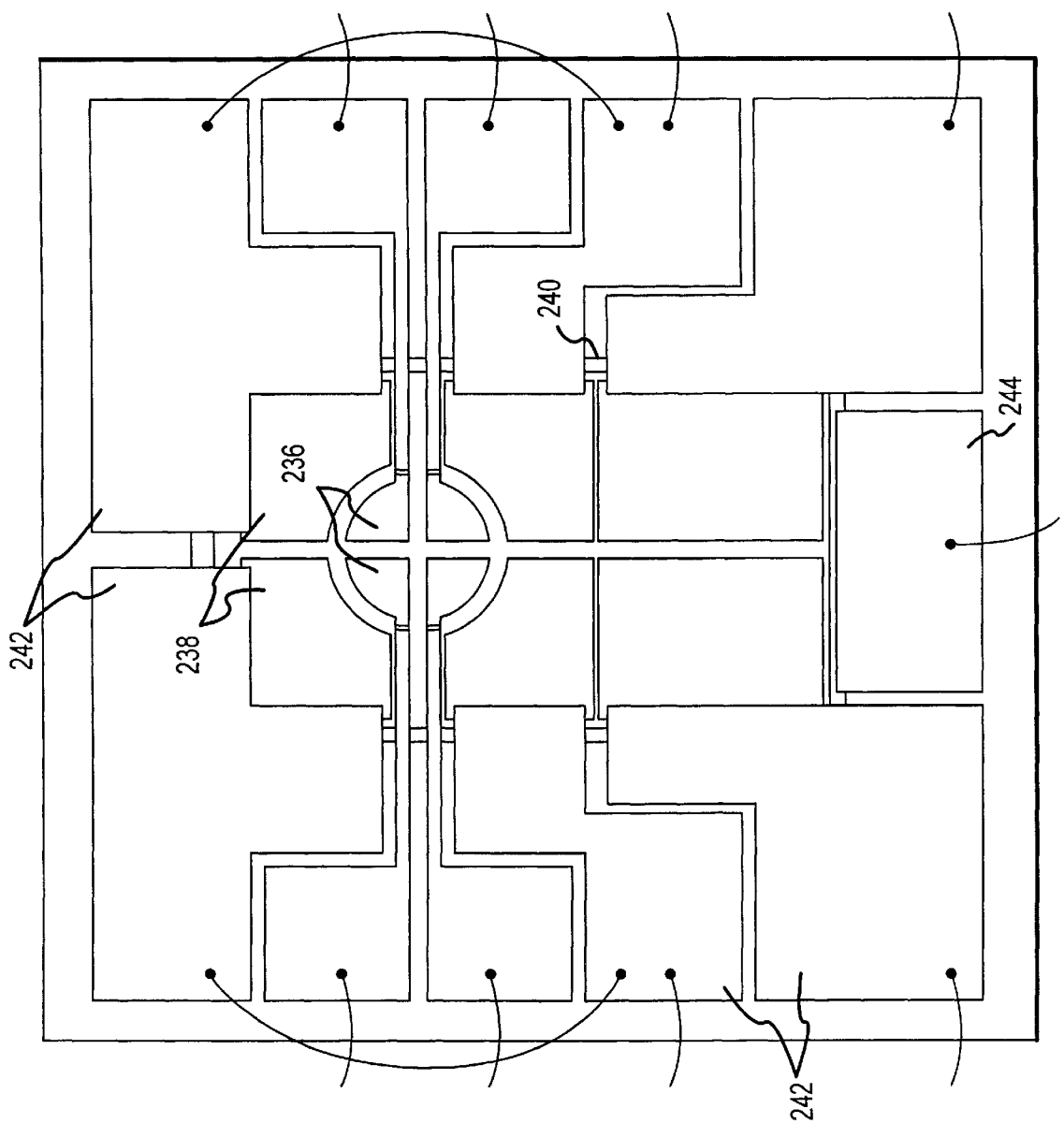
Figure 28:
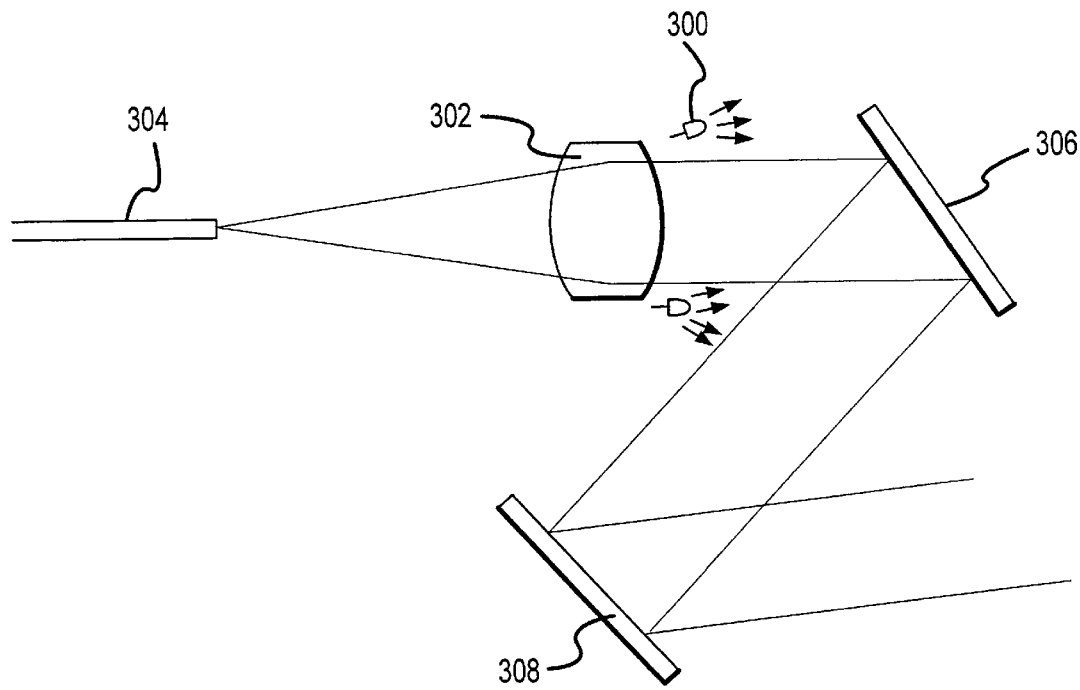
FIG. 28 shows an alternative optical configuration for a switch in accordance with the present invention.

FIGS. 27A–27C show further alternative sensor configurations. A potential problem in chip mounted sensors relates to sensor currents produced by photons incident on the detector outside of the designated sensor areas. The sensor surfaces can be defined by depositing a diode material, such as a P++ material, on selected areas of the chip substrate. However, an associated depletion area will generally extend outwardly from the sensor surface defined by deposition of the diode material. Photons absorbed in the depletion area may create a current in the sensor. As a result, the sensor can sense photons outside of the desired sensor area, thereby creating an element of error and potentially rendering the system inoperative.

FIG. 27A shows one sensor configuration for addressing this potential problem. The illustrated sensor 200 is fabricated on a chip 202. The sensor 200 includes four quadrant alignment sensor surfaces 204, such as described above, and four quadrant targeting sensor surfaces 206. As shown, the alignment sensor surfaces 206 are formed within two of the targeting sensor surfaces 206. Connections to the alignment sensor surfaces 206 for reading out alignment signals are established by conductive leads 208 terminating in pads 210. Electrical contacts 212 can be welded to the pads 210. Connections to the targeting sensor surfaces 206 for reading out targeting signals are established by metallization areas 214 that provide a bonding surface for read-out electrical contacts 216. Contacts 218 are used to interconnect the metallization areas associated with the upper quadrant targeting sensor areas 206 of the left and right sides, respectively, to allow for a single read out contact for the two separate metallization areas associated with each such targeting sensor area 206. Appropriate insulating materials are provided between the various sensor surfaces and conductive elements for electrical isolation as desired.

The illustrated construction has certain construction/operational advantages. It is desirable to reduce the need for metallic masking near the sensor surfaces. Such masking can short to the sensor surfaces and may also reflect light back to the surfaces resulting in increased noise. In the illustrated embodiment, no such masking is required adjacent to the alignment sensor surfaces 204. Photons incident in the narrow area between the alignment surfaces 204 and targeting surfaces 206 will be collected by the closest sensor surface 204 or 206. Accordingly, the effective areas of the surfaces 204 and 206 extend to the mid-line of the narrow area in-between, and the surfaces can be dimensioned accordingly. Large metallization areas 214 can still be used to cover much of the chip 202 and provide easily accessible bonding pads without requiring large metallic masking adjacent to the alignment surfaces 204.

Another solution for the problem of migrating photons adjacent to the sensor surfaces is illustrated in FIG. 27B. In this case, a guard ring 232 is formed around the alignment sensor surfaces 222 and the targeting sensor surfaces 224. The various sensor surfaces 222 and 224 are connected to metallic bonding pads 226 by conductive leads 228. Insulation 230 is disposed between the diffusion areas 232 of chip 234 and the leads 228 for isolation. Similarly, an insulating material such as $SiO_2$ may be patterned to isolate the guard ring 232 from the leads 228 as necessary. The guard ring 232 is used to collect current due to photons incident outside of the sensor surface 222 and 224. The effective areas of each of the sensor surfaces 222 and 224 will extend to the mid-line of the area between itself and an adjacent sensor surface or guard ring. Pad 235 provides electrical connections to the guard ring 232.

FIG. 27C shows a combination of the designs of FIGS. 27A and 27B. In particular, upper quadrants of the targeting sensor areas 238 are configured to surround the alignment sensor areas 236. In addition, a guard ring 240 is provided around the sensor surfaces 238. Metallization 242 is provided to establish bonding surfaces for the sensor surfaces 236 and 238. Pad 244 provides an electrical connection to the guard ring. For purposes of clarity, the various insulating layers for electrical isolation have been omitted from the Figure. The illustrated construction thereby allows for convenient and accurate alignment and targeting detection with reduced diffusion noise.

Switch Control System

Figure 18:
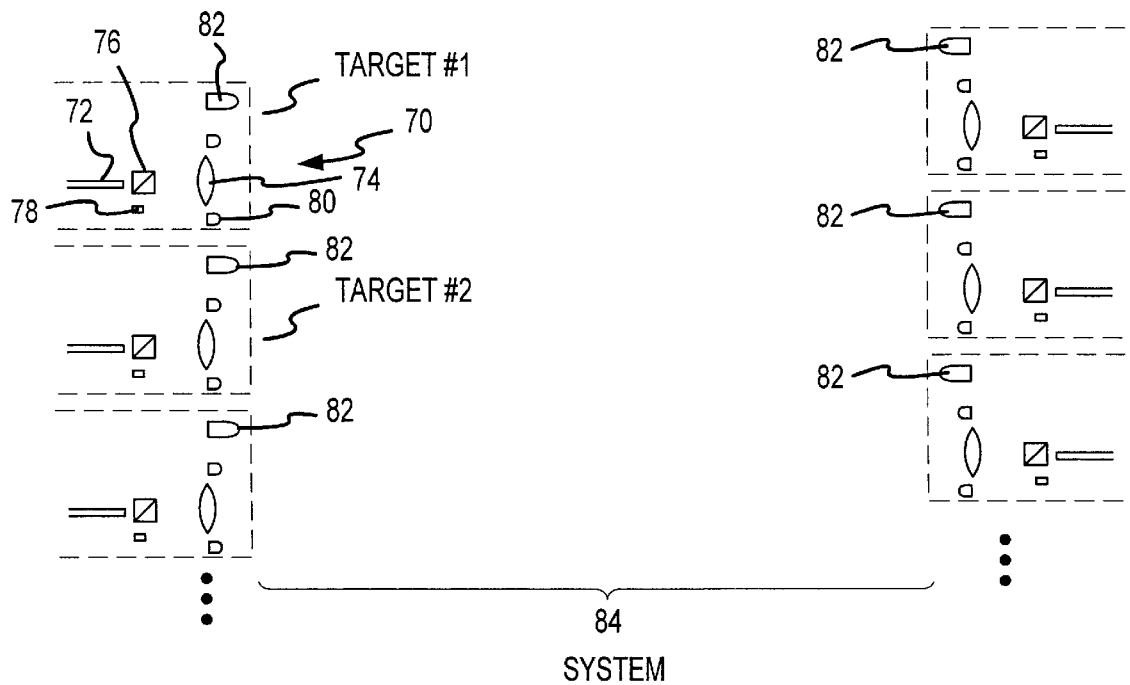
FIG. 18 is a side view depicting a portion of a switch incorporating a five RED fiber arrangement in accordance with the present invention.

FIG. 18 is a schematic diagram showing a portion of an N×N switch employing an off-path sensor configuration with a signal separator assembly. In the illustrated switch, each unit 70 includes a fiber 72, a lens 74, a signal separator 76 which may be a beam splitter cube as described above, a sensor unit 78, servo-alignment REDs 80, and a separate target identification RED 82. Not shown in FIG. 18 are the components for computing and actuating the optical path manipulations required for targeting and alignment. These components will be described below. FIG. 18 does illustrate a number of preferred characteristics of the inventive control system. First, it is noted that the various control elements are provided in connection with each of the units 70 on either side of the switch interface 84. It will thus be appreciated that targeting and alignment as between two fibers 72 is a cooperative process involving control components associated with each fiber 72. Moreover, multiple simultaneous connections can thereby be accommodated. In addition, the REDs 80 and 82 may be located away from the fibers 72 as shown in FIG. 18, for example, at a plane of a lens 74 or other optical element.

Figure 19:
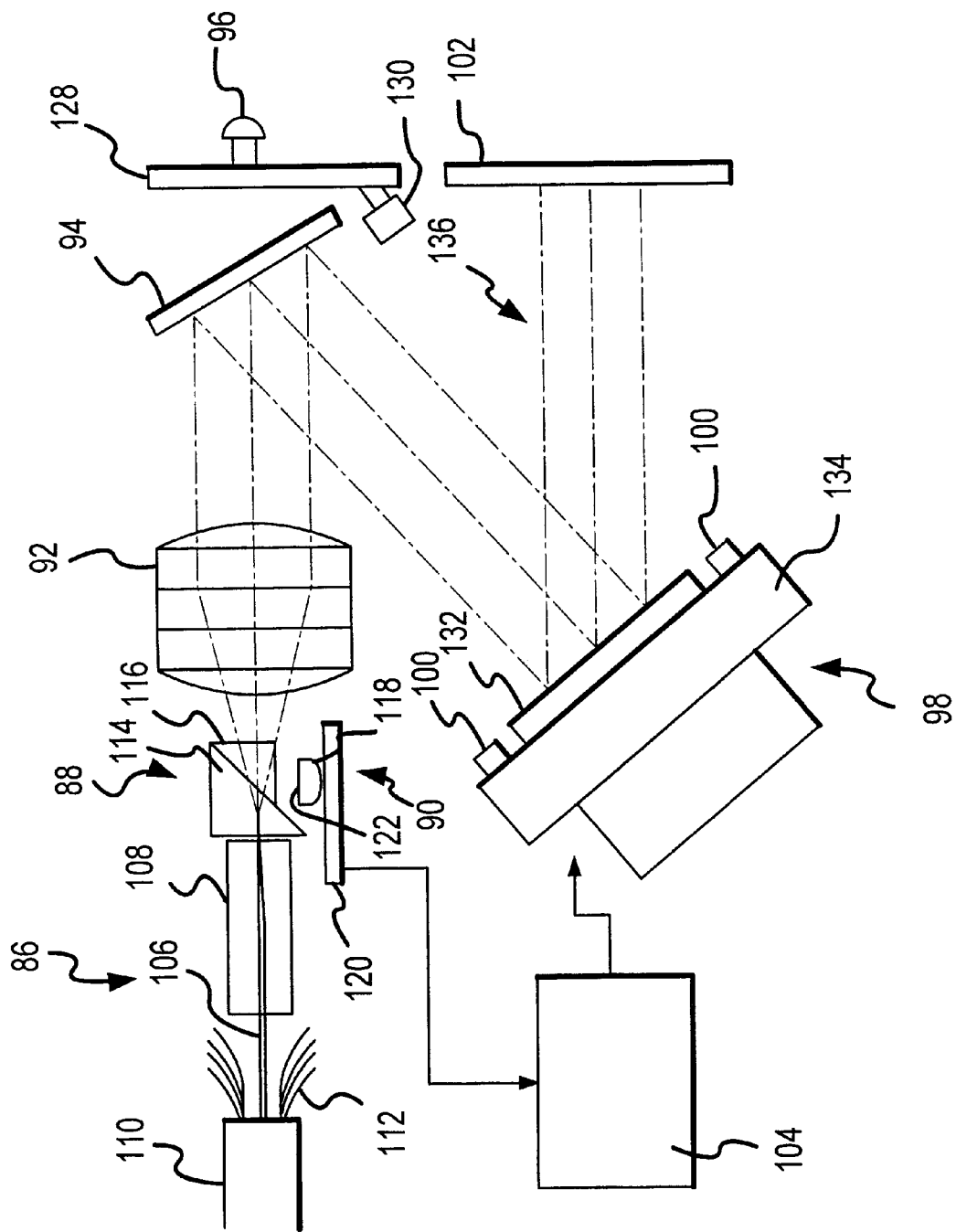
FIG. 19 is a side view showing control components associated with a single fiber in accordance with the present invention.

FIG. 19 is a partial schematic diagram showing the components associated with a single fiber of an optical switch. The components generally include a fiber assembly 86, a signal separator 88, a sensor unit 90, a lens assembly 92, stationary mirror 94, targeting RED 96, moveable mirror assembly 98 with mounted alignment REDs 100, window 102 and a processor 104. Each of these components is described in turn below.

The fiber assembly 86 includes a conventional optical fiber 106 for use in transmitting optical communication signals, a ferrule 108, and a fiber cable 110 including strength members 112 formed from Kevlar or other suitable material. The strength members 112, which impart strength to the cable 110 and allow the cable 110 to flex without damaging the fiber 106, are generally wrapped about the fiber 106, set in an adhesive and encased within the cable sleeve. The resulting cable 110 is typically about 2–3 mm in diameter. The ferrule 108, which may be formed from glass, ceramic or other materials, holds the bare fiber 106 adjacent to the signal separator 88. In this regard, the fiber/ferrule may be glued to the signal separator 88 using an adhesive having an index of refraction matched to those of the fiber 106 and separator 88 so as to minimize reflection at the interface. The fiber 106 and ferrule 108 are preferably polished together.

The separator 88 separates the control signals from the communication signals so that the control signals are received by the sensor unit 90 and the communication signals are received by fiber 106. This separation can be achieved using a beam splitter, coated filter, pellicle based filter or other mechanism for distinguishing between and separating the respective signals based on an optical characteristic of the signals such as wavelength. The illustrated separator 88 is a dichroic beam splitter, formed from two prismatic blocks 114 and 116 having a wavelength dependent response as discussed above. In this manner, the communication signals, which may have a wavelength of 1310 nm or 1550 nm, are transmitted to the fiber 106 and the control signals, which may have a wavelength of 880 nm or 950 nm, are reflected to the sensor unit 90. This response is achieved by applying an appropriate coating on a surface of at least one of the blocks 114 or 116 at the block interface to effectively define an optical band pass filter for passing the communication signals and reflecting the controls signals.

It is desirable to locate the sensor unit 90 such that the optical path length from the lens assembly 92 to the sensor unit 90 is approximately the same as the optical path length from the lens assembly 92 to the fiber 106. In this manner, the lens assembly 92 can focus the communication signals on the fiber 106 as desired and focus the control signals on the plane of the sensor surface of sensor unit 90 for enhanced detection. However, it will generally be impractical to bond the sensor unit 90 to the separator 88 such that the sensor surface is closely adjacent to the lower surface of lower block 116. Accordingly, the lower block 116 of the separator 88 may be somewhat smaller than the upper block 114 so that the sensor unit 90 can be properly positioned.

From the foregoing discussion, it will be appreciated that proper positioning and alignment of the lens assembly 92, separator 88, sensor unit 90 and fiber assembly 86 is a matter of some importance. These components can be assembled in the following manner to ensure proper positioning and alignment. First, the fiber 106 and ferrule 108 are glued to the upper block 114 using an index matched adhesive. The sensor unit 90 is then placed roughly in position relative to the bonded unit formed by the fiber 106 and block 114. The lower block 116 is then placed in position against the upper block 114 over the sensor unit 90. The sensor unit 90 can then be moved in three dimensions until the sensor surface is superimposed on the end of the fiber 106, as seen by the eye from the perspective corresponding to the location of lens assembly 92, and the various components are glued in place to maintain the alignment. The lens assembly 92 is then positioned using an adjustable mount so that the signals are focused on the fiber 106 and detector surface.

Figure 23:
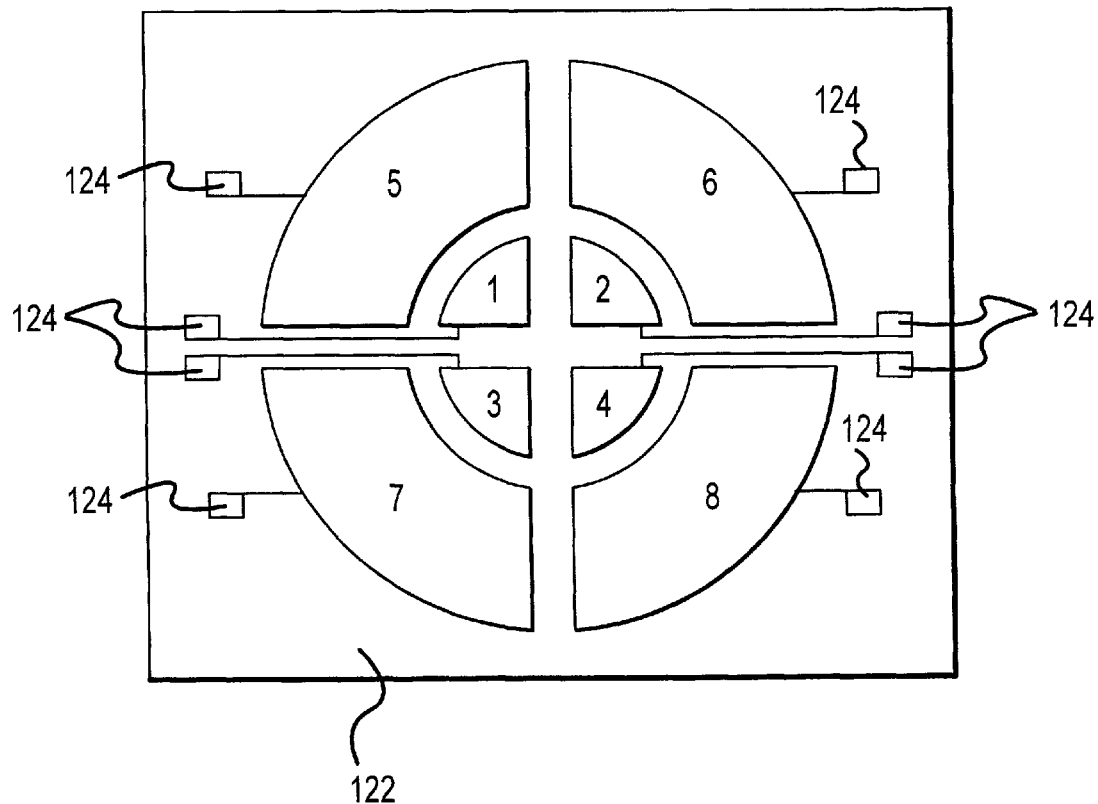
FIG. 23 is a top view showing a sensor design that can be used in connection with the control components of FIG. 19.
Figure 24:
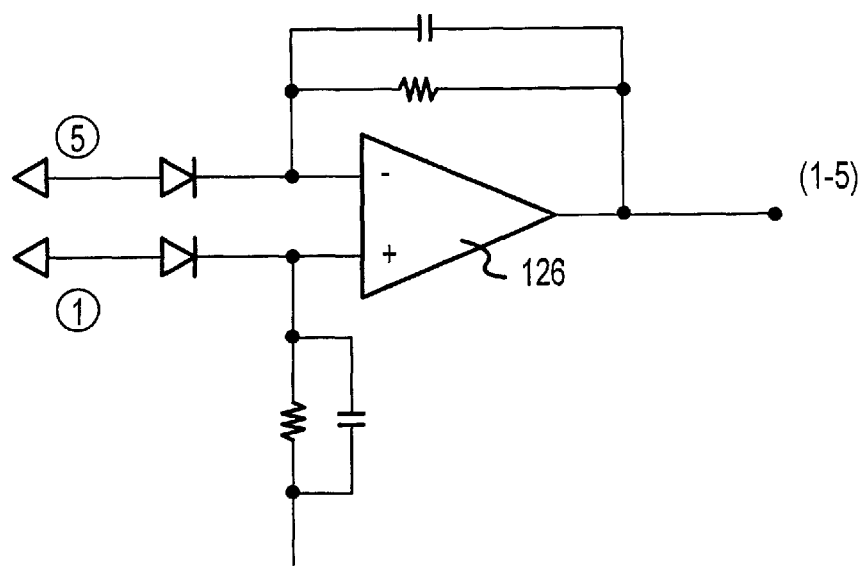
FIG. 24 is a circuit diagram of circuiting for use in connection with the sensor design of FIG. 23.

The sensor unit 90 includes a sensor chip 118 mounted on a printed circuit board 120. The sensor surface(s) are fabricated on the chip 118. The associated circuitry may be located on the chip 118 or on separate chips mounted on the board 120. FIGS. 23 and 24 show one sensor surface configuration and related circuitry. The illustrated sensor surface 22, which corresponds to a four RED embodiment for alignment and/or targeting, is partitioned by quadrants and includes inner and outer sensor areas within each quadrant, for a total of eight sensor areas (designated 1–8 in FIG. 23). As shown, each of the sensor areas (1–8) is associated with abonding pad 124 for electrical connection. The partition areas between the quadrants are used to run electrical leads to the inner surfaces (1–4). The control system geometry is configured such that signals from one of the REDs are received in each of the quadrants. In order to obtain information regarding the radial location of incidence of signals, the detection scheme may be differential by quadrant, i.e., the output from area 1 may be compared to that from 5; the output from area 2 may be compared to that of area 6; area 3 may be compared to area 7; and area 4 may be compared to area 8.

FIG. 24 shows a simple circuit for processing the outputs from a quadrant pair; in this case, area 1 and area 5. The outputs from area 1 and area 5 are provided as the inputs (designated 1 and 5) of an operational amplifier 126. The output (designated 1–5) from amplifier 126 is therefore proportional to the difference between the signals from area 1 and area 5. This output value, in turn, is proportional to a radial location of incidence of an optical signal in the associated quadrant. Similarly, values are obtained for the other three quadrants relating to radial locations of signal incidence in those quadrants. These values are provided to processor 104, which may be a computer, which uses these values to compute an appropriate adjustment of moveable mirror assembly 98 (FIG. 19) to achieve the desired alignment. It will be appreciated that the required adjustment can be calculated based on the known location of incidence of the signals and system geometry, by using basic geometric principles.

Referring again to FIG. 19, the lens assembly 92 receives incoming signals (via window 102, mirror assembly 98, and mirror 94) and focuses the signals on fiber 106. The lens assembly 92 also receives outgoing signals from fiber 106 and transmits such signals in a focused beam through window 102 via mirror 94 and mirror assembly 98. The lens assembly 92 can be an appropriate lens doublet or triplet for providing the desired optical performance. In this regard, only on-axis performance is required due to the optical geometry of the system. It will be appreciated that the optical arrangement of the illustrated embodiment allows for construction of very large switches, e.g., 1000×1000 or larger, as the optical configuration directs signals on-axis into the lens despite large transmission angles (relative to the lens axis) within the switch interface.

Mirror 94 is provided primarily for optical path folding and any appropriate mirror may be used in this regard. RED 96 is mounted on a circuit board 128 for providing the proper power signals to control pulsing of the RED 96. A radiation detector 130 is also mounted on board 128 facing the REDs 100 mounted on assembly 98. This detector 130 measures the amount of radiation emitted by the REDs for calibration and maintenance purposes.

FIG. 19 generally shows that the transmitted signal is collected by lens assembly 92 to form a beam for transmission across the switch interface. In order to reduce optical losses, the transmitted beam is preferably a focused beam as opposed to, for example, a collimated beam (composed of substantially parallel rays). Such focusing optics are illustrated in FIGS. 30A–30B. For ease of illustration, folding optics and moveable mirrors (or other beam directing elements) are omitted. As shown in FIG. 30A, signals from first end 400 of first optical fiber 402 are imaged by first focusing optics 404 substantially on a surface of second focusing optics 406 thus defining a first focused beam 405.

Second focusing optics 406 receives the first focused beam 405 and distributes the signal across end 408 of second optical fiber 410. Similarly, as shown in FIG. 30B, signals from second fiber end 408 are imaged by second focusing optics substantially on a surface of first focusing optics 404 thus defining a second focused beam 407. First focusing optics receives the second focused beam 407 and distributes the signal across end 400 of first fiber 402. Such focusing ensures that optical losses are minimized and optical efficiency is enhanced.

Generally, such focusing is a function of the positioning of the optics 404 and 406 relative to the fiber ends 400 and 408 (as defined by distances u and v), the effective aperture of the fibers 402 and 410, the effective aperture(s) of the optics (D) the numerical aperture (NA) of the fibers and the focal length(s) (f) of the optics. More particularly, optical efficiency can be optimized by arranging the optics to satisfy the following three equations:

$$D = 2u \sin^{-1}(NA)$$

$$1/f = 1/v + 1/u$$

$$d/u = D/v$$

NA is defined as the sine of the fiber emitting angle $\alpha$. A thin lens approximation is assumed, and D>>d is also assumed. For the purposes of these equations, in the case that the beam is a Gaussian beam, the effective values of d, D and NA are determined on a $1/e^2$ basis.

Returning to FIG. 19, the moveable mirror assembly 98 includes moveable mirror surfaces 132 with related control elements and REDs 100 mounted on a housing 134. The assembly 98 is used to actuate both targeting and alignment adjustments. The mirror surfaces 132 move in response to commands from processor 104 to allow for adjustment of the optical path of the communication and control signals received through window 102 in two dimensions relative to the fiber 106 and sensor unit 90. Any moveable mirror unit with appropriate two-dimensional adjustability, response rate and command input interfaces may be employed in this regard. The illustrated assembly employs a chip mounted, micro electro mechanical (MEM) mirror such as manufactured by Texas Instruments.

Figure 25:
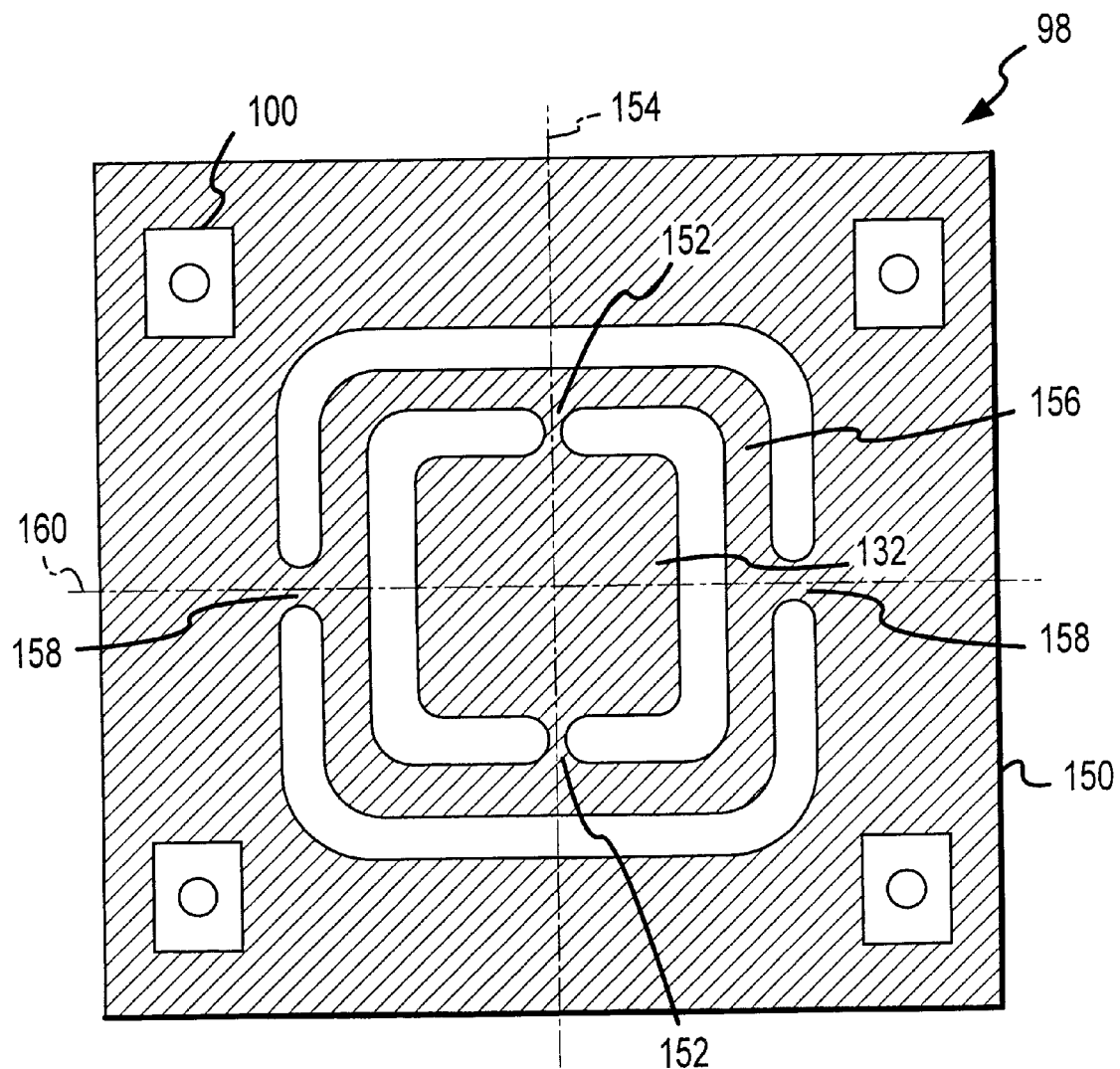
FIG. 25 is a top view of a moveable mirror assembly for use in connection with the control components of FIG. 19.

FIG. 25 shows such a chip mounted moveable mirror assembly 98. As shown, the assembly 98 includes mirror surface 132 and alignment REDs 100 mounted on a chip 150. The mirror surface 132 is supported on a gimbal mechanism that provides two degrees of freedom. In particular, two axially aligned flexible hinges 152 allow the mirror to pivot about a first axis 154. The hinges 152 and axis 154, in turn, are supported within a plane defined by rigid frame 156. The frame 156 is interconnected to the chip 150 via two aligned flexible hinges 158 that allow the mirror surface to pivot about a second axis 160. This gimbal mechanism, which may be fabricated in one part from silicon, thereby provides two degrees of freedom for targeting and alignment. In this regard, the mirror surface 132 and/or frame 156 are designed to respond to changes in an electromagnetic field so as to pivot in a known manner based on local field changes. Such field changes are controlled by providing appropriate signals, e.g., currents, to chip mounted electromagnetic elements adjacent to the mirror surface 132 and frame 156.

It will be appreciated that, instead of providing one mirror that provides two dimensions of beam directing control, two or more movable mirrors could be utilized, e.g., two mirrors that each provide one-dimension of beam directing control. However, the illustrated one movable mirror embodiment may be preferred for certain applications as it allows for smaller mirrors. That is, in the case of two movable mirrors, the beam would move about the surface of at least one of the movable mirrors, due to movement of the other mirror, thereby requiring a larger mirror for minimum signal loss.

Referring to FIG. 19, the REDs 100 are mounted on housing 134 in known relation to the fiber 106 relative to the optical path, generally indicated at 136. In the illustrated embodiment the REDs 100 and RED 96 are near infrared emitting diodes, e.g., emitting radiation having a wavelength of 880 nm or 950 nm. Preferably, the REDs 96 and 100 associated with a particular fiber operate independently relative to the REDs of other fibers in the switch and are not dependent on a common system clock. Window 102, which is preferably substantially transparent to the communication and control signals, is provided to keep the unit clean. In this regard, the space within the chassis housing may be filled with clean dry air or dry nitrogen.

Figure 26:
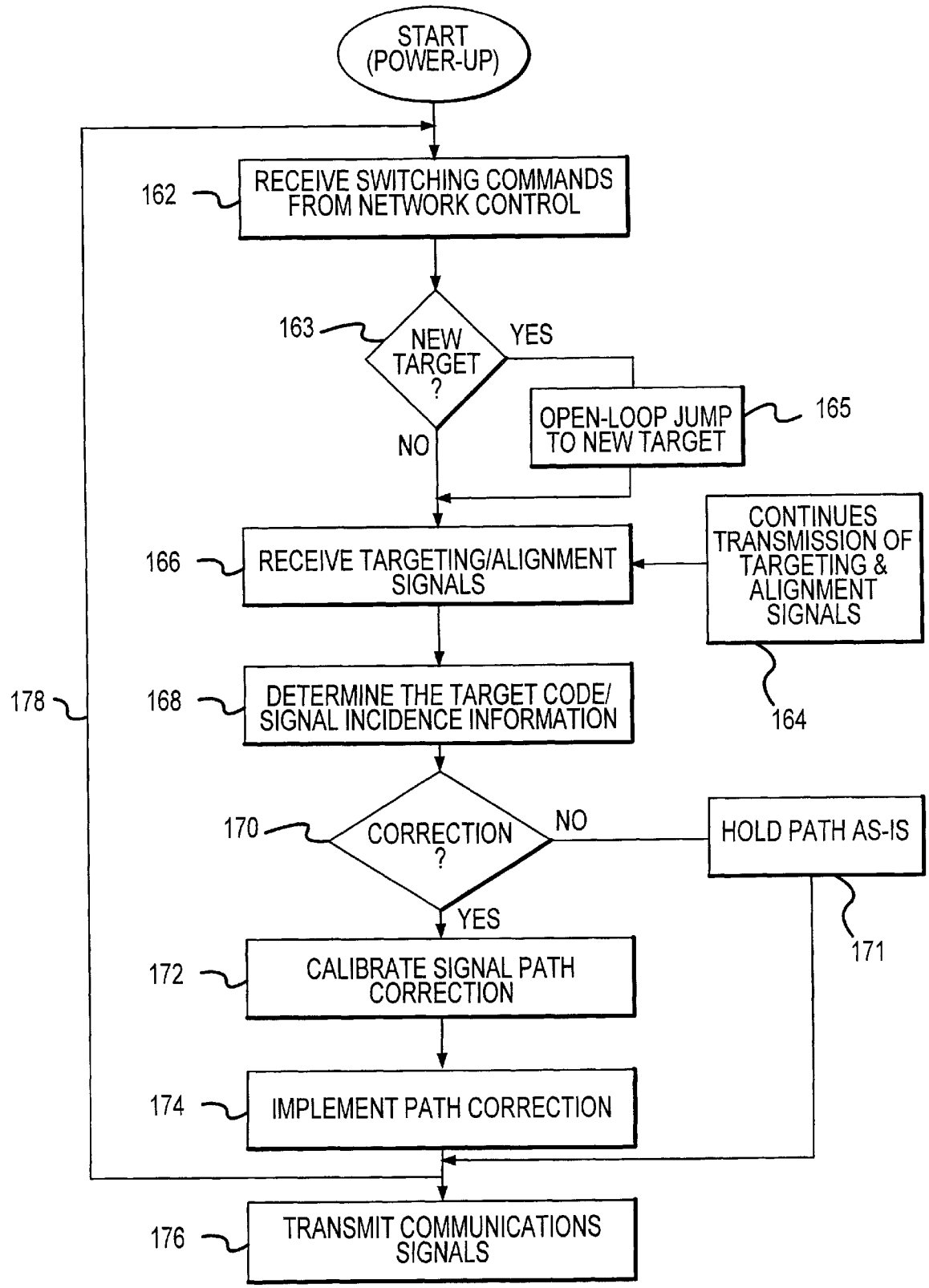
FIG. 26 is a flow chart illustrating a closed loop servo targeting and alignment control processed in accordance with the present invention.

FIG. 26 is a flow chart illustrating the closed-loop servo targeting and alignment control process. The process involves receiving (162) a command from a network controller indicating that a given first side fiber line is to be connected to a given second side fiber line. It will be appreciated that such commands may be received on a relatively infrequent basis in comparison to the alignment control signals which are transmitted continuously. When a new target is indicated (163) based on switching commands, the moveable mirrors are operated to effect an open-loop jump (165) to the new target. The alignment and targeting REDs of the fibers to be aligned then continue operation as described above to transmit (164) targeting and alignment signals. The signals transmitted by each of the subject fibers are received (166) by the sensor(s) of the other subject fiber. Based on output signals from the sensors, a processor determines (168) information regarding a target code and incidence locations of the signals. For example, the output signals may indicate that the correct fibers are connected and are properly aligned for transmission of communications signals therebetween, or the output signals may indicate that the optical path is aligned to the right or left, or up or down, from the targeted fiber end. As described above, such information is readily derived based on the known spatial relationships between the REDs, the sensors and the fiber end.

Based on this information, the processor determines (170) whether a path correction is required to effect the desired connection or for proper alignment. If no correction is required then the alignment process is complete and the optical path is held (171) as is. If correction is required, the processor calculates (172) an appropriate corrective action based on knowledge of the system geometry. Such corrective action may involve, for example, bending a fiber end using a piezoelectric bender or moving a moveable mirror. The corrective action is implemented (174) by transmitting appropriate signals to the associated actuators and the control system continues to monitor switching commands to identify further switching processes. It will be appreciated that this alignment process is executed on a substantially real-time basis by components associated with both of the subject fiber lines. For enhanced accuracy, such alignment is monitored on a repeated or continuous basis, as generally indicated by feedback loop (178), to iteratively optimize alignment. This feedback loop may be repeated, for example, about 500 times per second and continues throughout operation of the switch. Once an acceptable connection has been made, communications signals may be effectively transmitted (176) between the subject lines.

Figure 20:
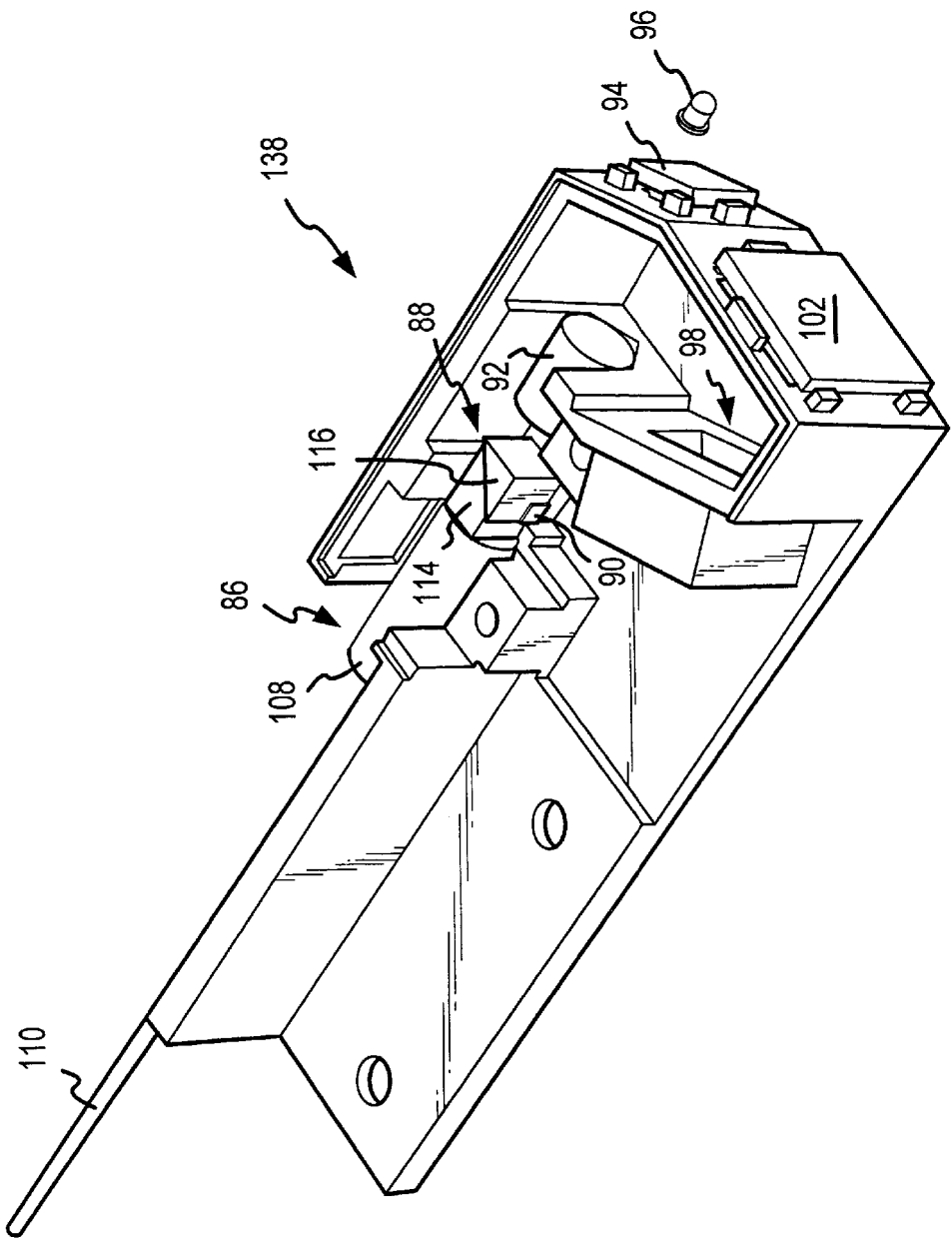
FIG. 20 is a perspective view showing the control components associated with a single fiber incorporated into a tray structure in accordance with the present invention.
Figure 21:
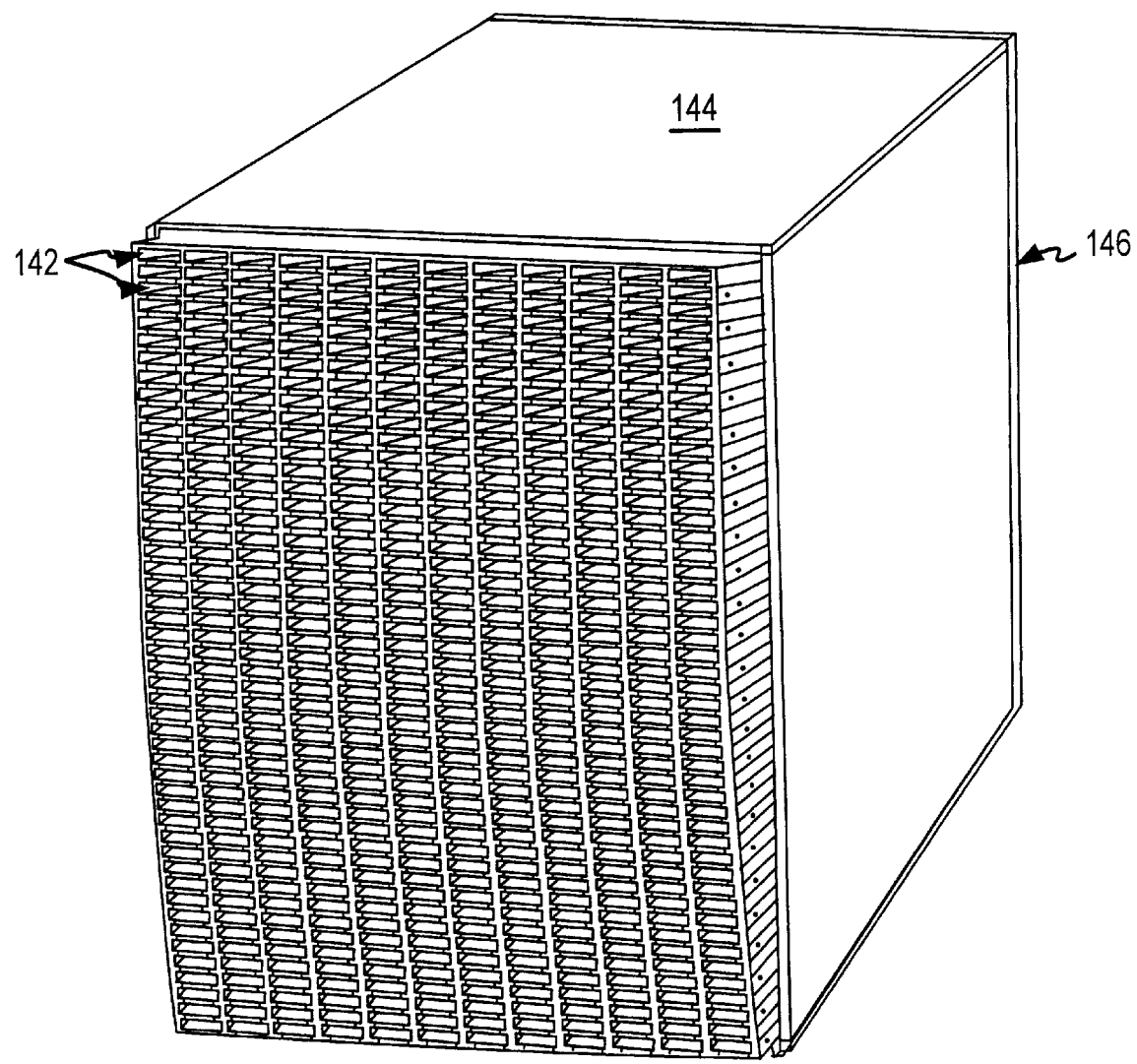
FIG. 21 is a perspective view showing a chassis in accordance with the present invention.
Figure 22:
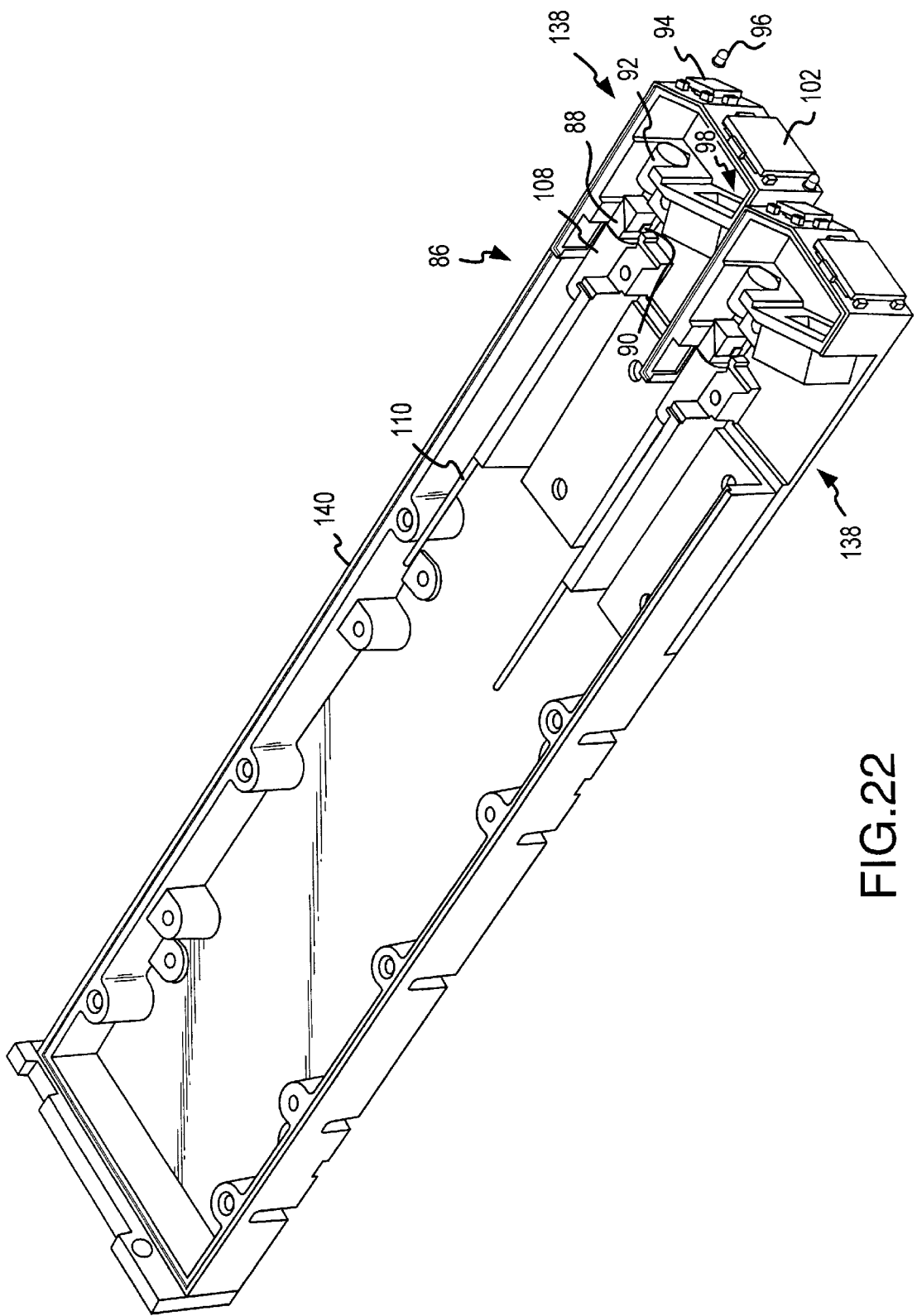
FIG. 22 illustrates a tray structure for housing two fiber ends with related control elements in accordance with the present invention.

FIGS. 20–22 show an implementation of the components illustrated in FIG. 19 in a specific switch embodiment. For ease of reference, corresponding components from FIG. 19 are identified by corresponding numerals in FIGS. 20–22. As shown in FIGS. 20 and 22, a control unit 138 for a particular fiber 106 or a pair of such control units, are mounted in a tray 140. These trays 140 can be inserted into openings 142 in a chassis 144. In the illustrated embodiment, the chassis 144 supports a mirror 146 such that the first side fibers and second side fibers are arranged in an interspersed or side-by-side configuration. It will be appreciated that this tray and chassis construction allows for removal of individual trays for repair and maintenance as required without unduly affecting network operation.

Figure 29C:
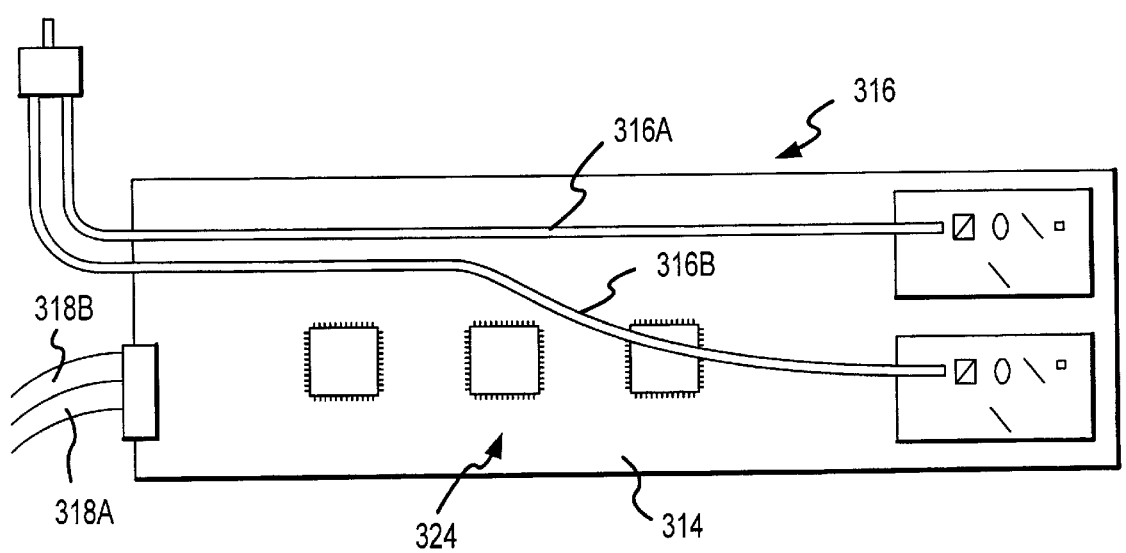
FIGS. 29A–29C show a chassis implementation in accordance with the present invention.
Figure 29A:
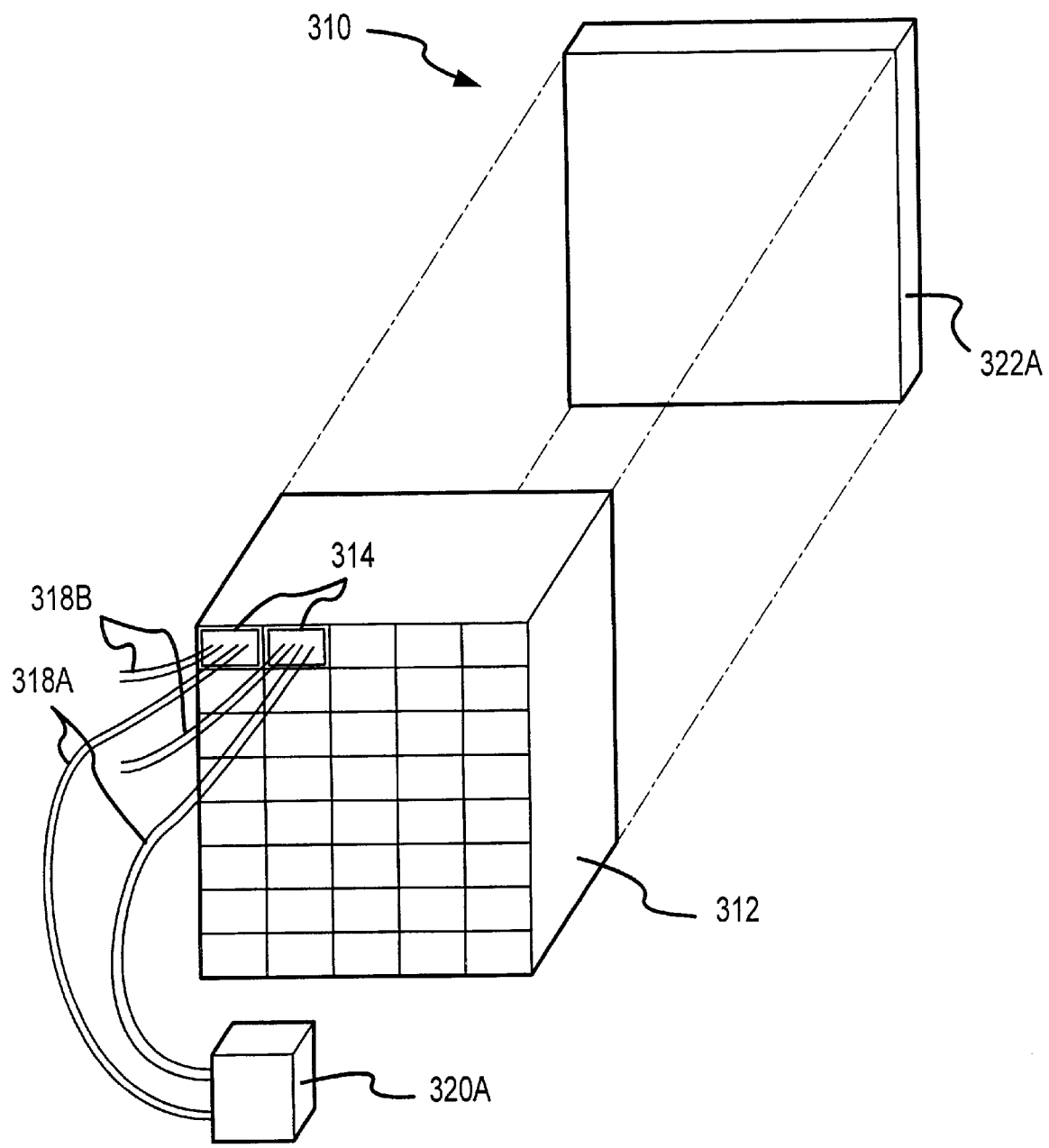
Figure 29B:
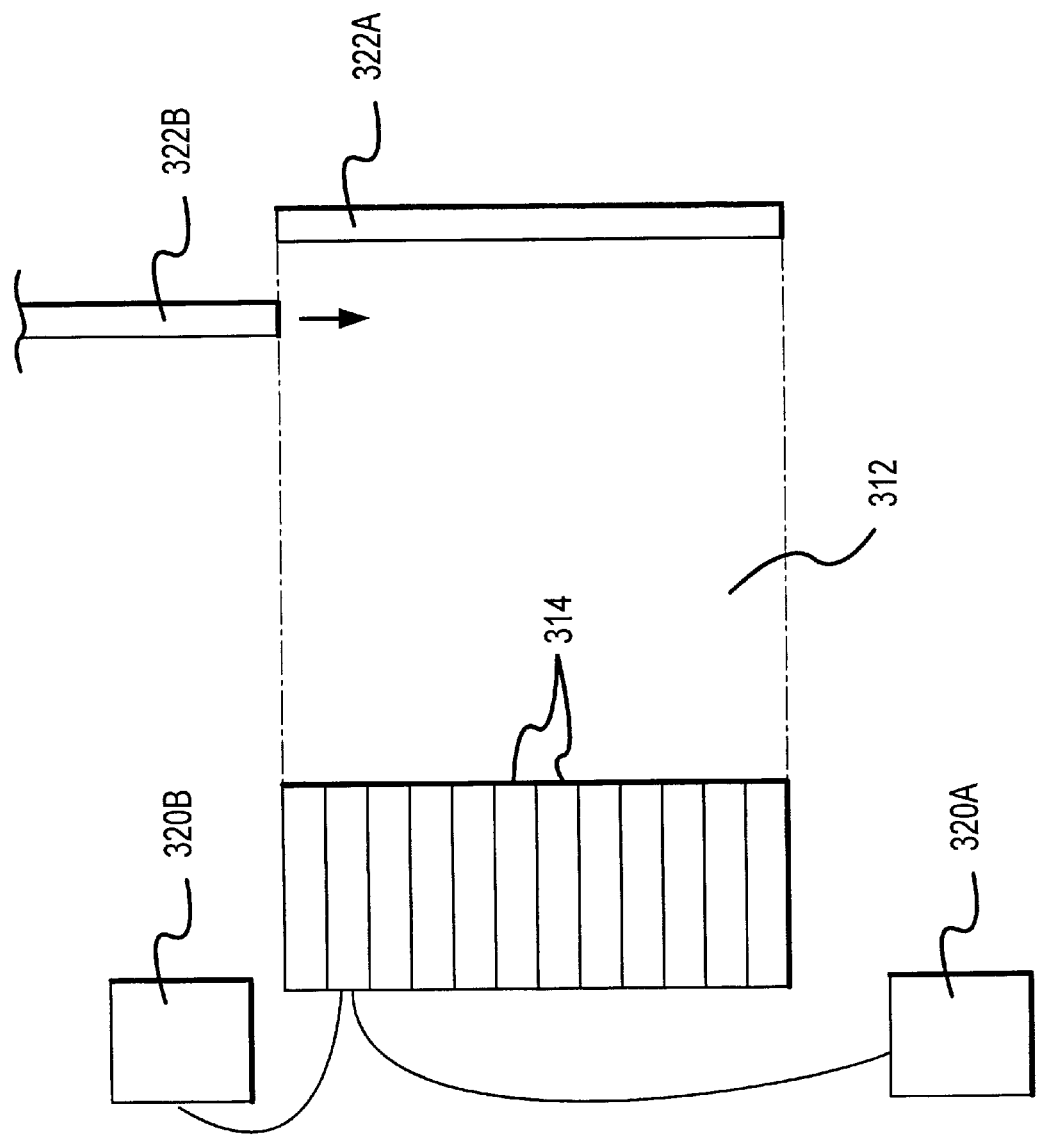

FIGS. 29A–29C are schematic diagrams illustrating a further chassis implementation in accordance with the present invention. As shown in FIG. 29A, the switch 310 includes a chassis 312 for receiving a number of trays 314. Each tray 314 supports two fibers 316 and a beam directing unit for each fiber as described above. More particularly, each tray supports an input fiber 316A and an output fiber 318B as well as chip mounted electronics 324 for controlling the movable mirrors, REDs and detectors associated with the two fibers. The electronics 324 are connected via lead 318A associated with a controller 320A, which may include a computer system, for providing switching instructions. For example, the controller 320A may be interconnected to a telecommunications network switch operator. A similar controller 320B (FIG. 29B) is connected to the electronics 324 via lead 318B. Each of the controllers 320A/320B controls both the transmit and receive elements, and dual controller 320A/320B are included for redundancy. The input and output fibers 316A and 316B are optically interconnected via mirror 320A. In order to allow replacement or servicing of the mirror 322A, a second mirror 322B may be provided for sliding in front of the mirror 322A as desired. Precise positioning of the mirrors 322A and 322B can be accomplished by providing slots in a chassis housing for maintaining the mirror positions. It will be appreciated that the servo-control systems of the present invention readily accommodate any optical adjustments required as a result of mirror substitution.

Figure 31:
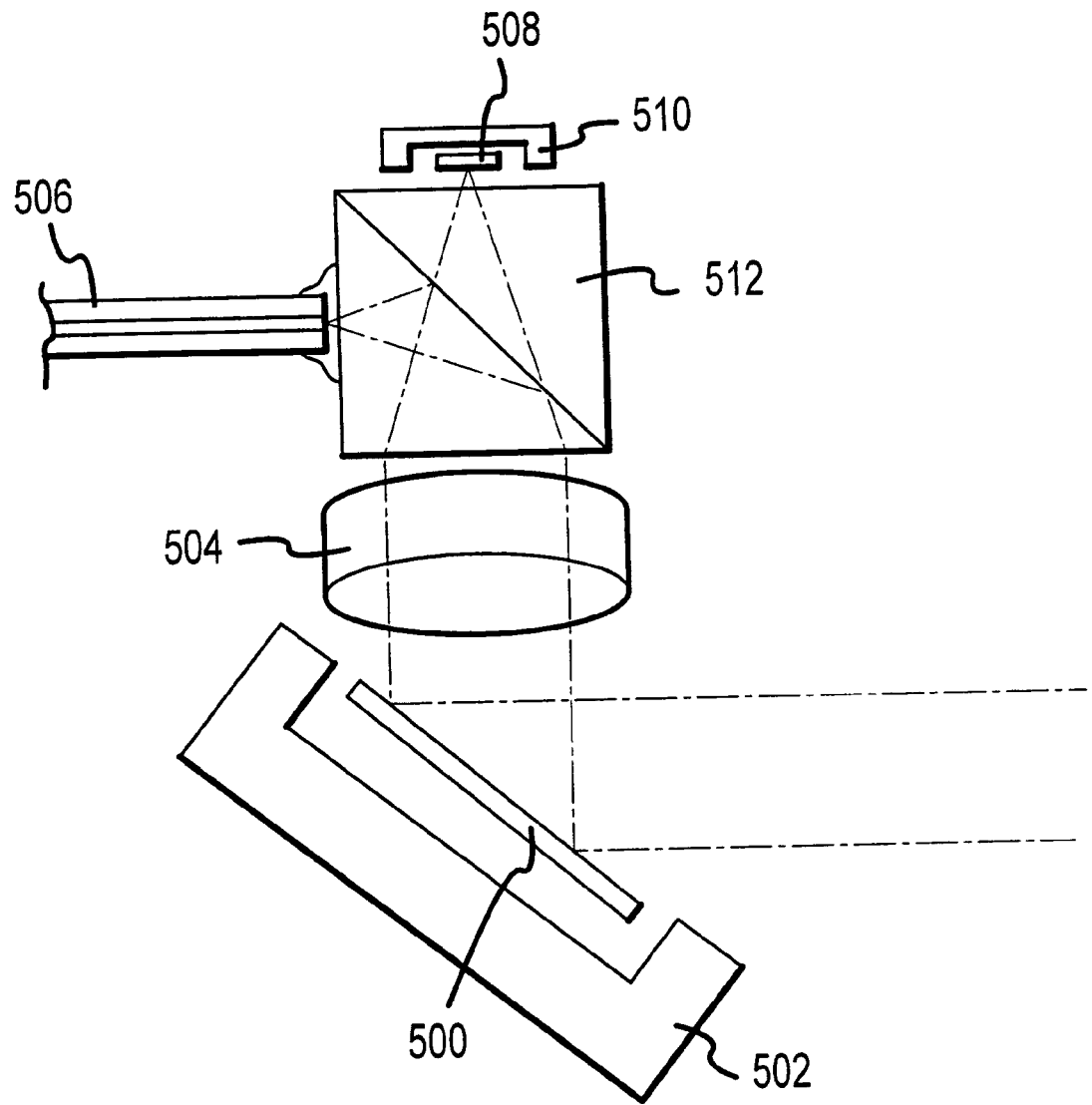

FIG. 31 shows a further alternative configuration of a beam directing unit that eliminates the use of a stationary mirror, thereby simplifying the design and possibly reducing optical losses. In the illustrated embodiment, received signals are transmitted by a moveable mirror 500 housed in mirror housing 502 to focusing lens 504 without any intervening mirrors. The focusing lens 504 focuses the received signals (on a wavelength dependent basis) on the end of fiber 506 or onto a detector 508 housed in detector housing 510 via dichroic beam splitter 512.

FIG. 32 shows a further alternative configuration of a beam directing unit that eliminates the need for a beam splitter. In particular, this configuration takes advantage of the wavelength transmission characteristics of silicon to interpose a control signal detector 600 in the communications signal path. Since silicon is substantially transparent to wavelengths above about 1200 nm, 1310 nm or 1550 nm (for example) communications signals are transmitted through the detector 600 to the core 608 of fiber 610 whereas control signals having wavelenths of, for example, 880 or 950 nm are absorbed and detected by detector 600. The detector 600 can be mounted on a ceramic substrate 602 using glue 604. Electrical connections are effected by bonding wires 606. The detector 600 can be bonded to fiber 610 by index matching glue 612.

FIG. 33 shows an embodiment similar to that of FIG. 32 with like items identified by corresponding numerals. In this case, however, the detector is etched to form a receptacle 614 for engaging the fiber 610, thereby facilitating accurate relative positioning of the fiber to the detector and is further etched to define a cavity 616. The cavity 616 reduces the thickness of the detector 600 for better spatial resolution with respect to the incoming, generally conical beam.

While various embodiments of the present invention have been described in detail, it is apparent that further modifications and adaptations of the invention will occur to those skilled in the art. However, it is to be expressly understood that such modifications and adaptations are within the spirit and scope of the present invention.

What is claimed is:

1. A fiber optical control system for use in optically connecting a first fiber end of a first optical fiber with a second fiber end of a second optical fiber relative to an optical pathway between said first fiber end and said second fiber end so as to permit optical communication between said first and second optical fibers, said control system comprising:

source means, disposed in known spatial relationship to said first fiber end relative to said optical pathway, for transmitting a control signal on a first control signal pathway in general alignment with said optical pathway in an area between said first fiber end and said second fiber end;

sensor means, disposed in known spatial relationship to said second fiber end relative to said optical pathway, for receiving said control signal and providing an output signal related to said received control signal; and processing means, associated with said sensor means, for receiving said output signal and determining a correction relative to said optical path based on said output signal;

wherein said correction can be used to direct a communication signal between the first and second fiber ends relative to said optical pathway to establish an optical connection.

2. A fiber optical control system as set forth in claim 1, wherein said source means comprises a radiation emitting device for providing an optical control signal.

3. A fiber optical control system as set forth in claim 1, wherein said source means comprises a plurality of transmitters disposed at separate spatial locations relative to said optical pathway.

4. A fiber optical control system as set forth in claim 1, wherein said source means comprises at least one of a targeting signal source for providing a targeting signal and an alignment signal source for providing an alignment signal, wherein said targeting signal is used for target identification and said alignment signal is used for alignment.

5. A fiber optical control system as set forth in claim 1, wherein said source means comprises a plurality of radiation sources and means for modulating signals from said plurality of sources such that said signals can be distinguished from one another.

6. A fiber optical control system as set forth in claim 1, wherein said sensor means comprises a targeting sensor for receiving a targeting signal including target identification information.

7. A fiber optical control system as set forth in claim 1, wherein said sensor means comprises an alignment sensor for receiving an alignment signal for use in aligning said first and second fiber ends relative to said optical path.

8. A fiber optical control system as set forth in claim 1, wherein said sensor means comprises a targeting sensor for receiving a target identification signal and a separate alignment sensor for receiving an alignment signal.

9. A fiber optical control system as set forth in claim 1, wherein said sensor means comprises a signal separator for transmitting said control signal on a first exit pathway and transmitting said communication signal on a second exit pathway separate from said first exit pathway.

10. A fiber optical control system as set forth in claim 9, wherein said separator comprises means for selectively transmitting said control signal and said communication signal on said respective first and second exit pathways on a wavelength dependent basis.

11. A fiber optical control system as set forth in claim 9, wherein said separator comprises a mirror having a wavelength dependent response wherein one of said control signal and communication signal is substantially transmitted through said mirror and the other of said control signal and communication signal is reflected by said mirror.

12. A fiber optic control system as set forth in claim 1, wherein said processing means comprises means for determining incidence information regarding a location of incidence of said control signal on said sensor means.

13. A fiber optical control system for use in optically connecting a first fiber end of a first optical fiber and a second fiber end of a second optical fiber relative to an optical pathway between said first fiber end and said second fiber end so as to permit transmission of communication signals between said first and second optical fibers, said control system comprising:

first means disposed in known spatial relationship to said first fiber end relative to said optical pathway, for transmitting a control optical signal on a first control signal pathway in general alignment with said optical pathway in an area between said first fiber end and said second fiber end;

second means, disposed in known spatial relationship to said second fiber end relative to said optical pathway, for receiving said control signal and determining control information for use in optically connecting said first and second fiber ends based on said received control signal, said second means including a detector surface located separate from said optical pathway; and third means for diverting at least a portion of said control signal from said first control signal pathway to a second control signal pathway, said second control signal pathway being directed transverse to said optical pathway, said detector surface being located on said second control signal pathway.

14. A fiber optical control system as set forth in claim 13, wherein first means comprises a plurality of transmitters disposed at separate spatial locations relative to said optical pathway.

15. A fiber optical control system as set forth in claim 13, wherein first means comprises at least one of a targeting signal source for providing a targeting signal and an alignment signal source for providing an alignment signal, wherein said targeting signal is used for target identification and said alignment signal is used for alignment.

16. A fiber optical control system as set forth in claim 13, wherein second means comprises a targeting sensor for receiving a target identification signal and a separate alignment sensor for receiving an alignment signal.

17. A fiber optical control system as set forth in claim 13, wherein said third means comprises means for selectively transmitting said control signal and said communication signal on said respective first and second exit pathways on a wavelength dependent basis.

18. A fiber optical control system as set forth in claim 13, wherein said third means comprises a mirror having a wavelength dependent response wherein one of said control signal and communication signal is substantially transmitted through said mirror and the other of said control signal and communication signal is reflected by said mirror.

19. A fiber optical control system for use in optically connecting a first fiber end of a first optical fiber with a second fiber end of a second optical fiber relative to an optical pathway between said first fiber end and said second fiber end so as to enhance optical communication between said first and said second optical fibers, said control system comprising:

first means disposed in known spatial relationship to said first fiber end relative to said optical pathway, for transmitting a control signal on a control signal pathway in an area between said first fiber end and said second fiber end;

second means, disposed in known spatial relationship to said second fiber end relative to said optical pathway, for receiving said control signal and determining control information, for use in controlling said first and second fiber ends, based on said received control signal; and third means for receiving a communication signal transmitted by said first optical fiber and said control signal, and for selectively transmitting said communication signal on a first exit pathway to said second fiber end and said control signal on second exit pathway to said second means.

20. A control system as set forth in claim 19, wherein first means comprises at least one of a targeting signal source for providing a targeting signal and an alignment signal source for providing an alignment signal, wherein said targeting signal is used for target identification and said alignment signal is used for alignment.

21. A fiber optical control system as set forth in claim 19, wherein second means comprises a targeting sensor for receiving a target identification signal and a separate alignment sensor for receiving an alignment signal.

22. A fiber optical control system as set forth in claim 13, wherein said third means comprises a mirror having a wavelength dependent response wherein one of said control signal and communication signal is substantially transmitted through said mirror and the other of said control signal and communication signal is reflected by said mirror.

23. A fiber optical control system for use in optically connecting a first fiber end of a first optical fiber with a second fiber end of a second optical fiber relative to an optical pathway between said first fiber end and said second fiber end so as to permit optical communication between said first and second optical fibers, said control system comprising:

first means, disposed in known spatial relationship to said first fiber end relative to said optical pathway, for transmitting a control signal on a control signal pathway in an area between said first fiber end and said second fiber end;

second means, disposed in known spatial relationship to said second fiber end relative to said optical pathway, for receiving said control signal, said second means including a detector; and third means for determining incidence information relative to a location of incidence of said control signal on said detector;

wherein said location of incidence is useful in determining an adjustment for connecting said first and second fiber ends relative to said optical pathway.

24. A fiber optical control system as set forth in claim 23, wherein first means comprises at least one of a targeting signal source for providing a targeting signal and an alignment signal source for providing an alignment signal, wherein said targeting signal is used for target identification and said alignment signal is used for alignment.

25. A fiber optical control system as set forth in claim 23, wherein second means comprises a targeting sensor surface for receiving a target identification signal and a separate alignment sensor surface for receiving an alignment signal.

26. A fiber optical control system as set forth in claim 23, further comprising a signal separator for transmitting said control signal on a first exit pathway and transmitting said communication signal on a second exit pathway separate from said first exit pathway.

27. A fiber optical control system as set forth in claim 23, wherein said detector comprises a plurality of sensor surfaces and said third means comprises means for separately reading out output signals from said plurality of sensor surfaces and comparing said output signals.

* * * * *

UNITED STATES PATENT AND TRADEMARK OFFICE
CERTIFICATE OF CORRECTION

PATENT NO. : 6,097,858
DATED : August 1, 2000
INVENTOR(S) : Herzel Laor

It is certified that error appears in the above-identified patent and that said Letters Patent are hereby corrected as shown below:

On the title page, line [73], please delete "Calif." and insert therefor --Colo.--.

Signed and Sealed this

Seventeenth Day of April, 2001

*Attest:*

NICHOLAS P. GODICI

*Attesting Officer*      Acting Director of the United States Patent and Trademark Office